(12) United States Patent
Leucht-Roth

(10) Patent No.: US 8,938,551 B2
(45) Date of Patent: Jan. 20, 2015

(54) DATA PROCESSING DEVICE

(75) Inventor: Ulrich Leucht-Roth, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 161 days.

(21) Appl. No.: 13/469,204

(22) Filed: May 11, 2012

(65) Prior Publication Data

US 2013/0268689 A1 Oct. 10, 2013

Related U.S. Application Data

(60) Provisional application No. 61/622,074, filed on Apr. 10, 2012.

(51) Int. Cl.
*G06F 15/16* (2006.01)

(52) U.S. Cl.
USPC .......................... 709/232; 709/237; 370/235

(58) Field of Classification Search
None
See application file for complete search history.

(56) References Cited

U.S. PATENT DOCUMENTS

| | | | | |
|---|---|---|---|---|
| 4,672,535 | A * | 6/1987 | Katzman et al. ................. | 710/38 |
| 4,807,116 | A * | 2/1989 | Katzman et al. ............... | 710/113 |
| 6,671,287 | B1 * | 12/2003 | Huttunen et al. .............. | 370/469 |
| 6,721,353 | B1 * | 4/2004 | Taubert et al. ................. | 375/220 |
| 7,415,046 | B2 * | 8/2008 | Beckmann et al. ............ | 370/537 |
| 7,715,344 | B2 * | 5/2010 | Kim ................................ | 370/329 |
| 8,045,523 | B2 * | 10/2011 | Park .............................. | 370/331 |
| 8,098,771 | B2 * | 1/2012 | Herrmann ...................... | 375/340 |
| 2002/0051200 | A1 * | 5/2002 | Chang et al. .................. | 358/1.15 |
| 2005/0216599 | A1 * | 9/2005 | Anderson et al. ............. | 709/232 |
| 2009/0070479 | A1 * | 3/2009 | Anderson et al. ............. | 709/232 |
| 2009/0138603 | A1 * | 5/2009 | Surineni et al. ............... | 709/227 |
| 2009/0316904 | A1 * | 12/2009 | Klingenbrunn et al. ...... | 380/274 |
| 2013/0204962 | A1 * | 8/2013 | Estevez et al. ................ | 709/217 |

OTHER PUBLICATIONS

IEEE Standards Style Manual (May 2000) pp. 1-52.
MIPI Alliance Specification for DSI MIPI Alliance Specification for Display Serial Interface Version 1.01.00—Feb. 21, 2008 pp. 1-87.
MIPI Alliance Standard for Parallel Trace Interface MIPI Alliance Standard for Test & Debug—Parallel Trace Interface Version 1.00—Dec. 19, 2006 pp. 1-21.
MIPI Alliance Specification for Device Descriptor Block (DDB) Version 1.0—Oct. 30, 2008 pp. 1-38.
Draft MIPI Alliance Specification for HSI PL Draft MIPI Alliance Specification for High-speed Synchronous Serial Interface (HSI) Physical Layer Version 1.01.00 Revision 0.05—Sep. 30, 2008 pp. 1-43.

(Continued)

*Primary Examiner* — Hassan Kizou
*Assistant Examiner* — Phyllis Book

(57) ABSTRACT

According to one aspect of this disclosure, a data processing device is provided including a controller configured to open a logical channel with another data processing device and a receiver configured to receive a message from the other data processing device specifying a data link layer protocol data unit size to be used for exchanging data via the logical channel and further including a transceiver configured to exchange data with the other data processing device over the logical channel in accordance with the data link layer protocol data unit size wherein the data link layer protocol data unit size is constant for the logical channel until the logical channel is closed.

20 Claims, 34 Drawing Sheets

(56) References Cited

OTHER PUBLICATIONS

MIPI Alliance MIPI Alliance Specification for System Power Management Interface (SPMI) Version 2.0—Mar. 14, 2012 pp. 1-91.
MIPI Alliance Camera Parallel Interface Specification Version 1.0—Approved Mar. 23, 2004 pp. 1-10.
MIPI Alliance Camera Serial Interface Version 1.0—Approved Mar. 23, 2004 pp. 1-53.
MIPI Alliance Display Pixel Interface Specification Version 1.0—Approved Mar. 23, 2004 pp. 1-18.
MIPI Alliance High Speed Synchronous Serial Interface Specification Version 1.0—Jul. 2-17, 2006 pp. 1-57.
MIPI Alliance High Speed Synchronous Serial Interface Specification Version 1.0—Approved Mar. 23, 2004 pp. 1-61.
MIPI Alliance Specification for TWP MIPI Alliance Specification for Trace Wrapper Protocol Version 1.00.00—Feb. 23, 2010 pp. 1-25.

* cited by examiner

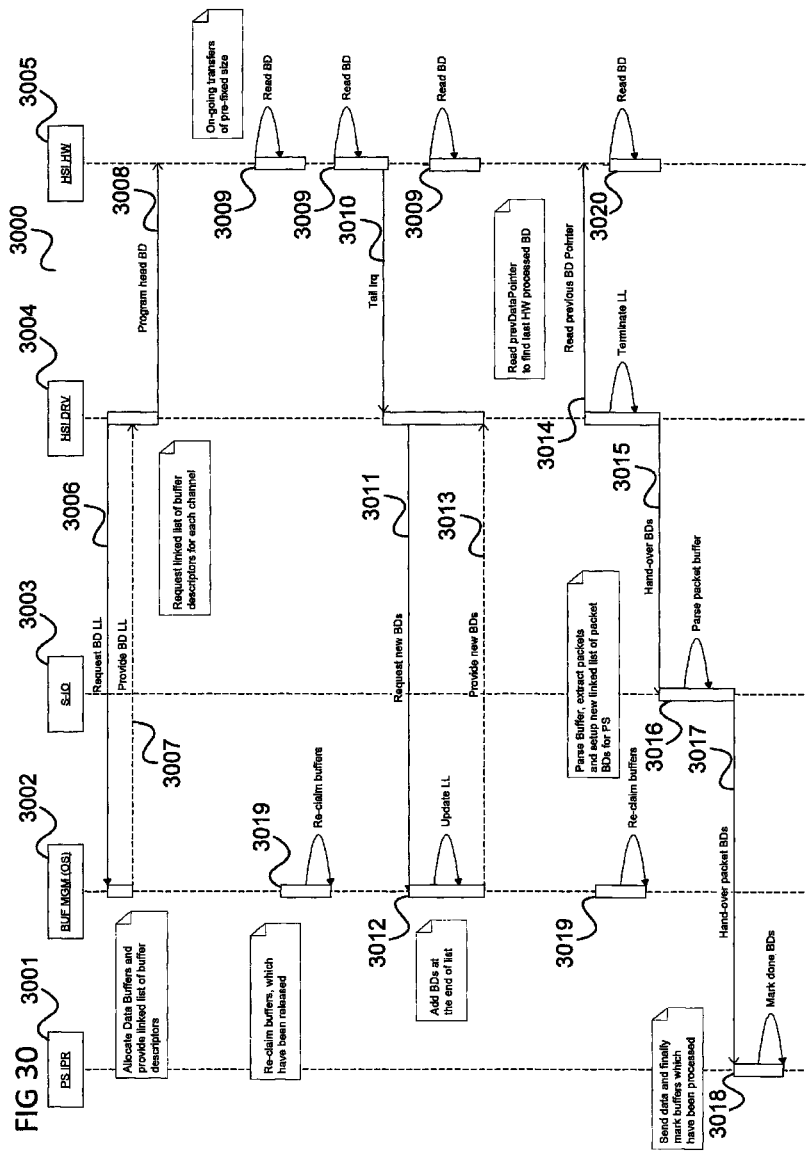

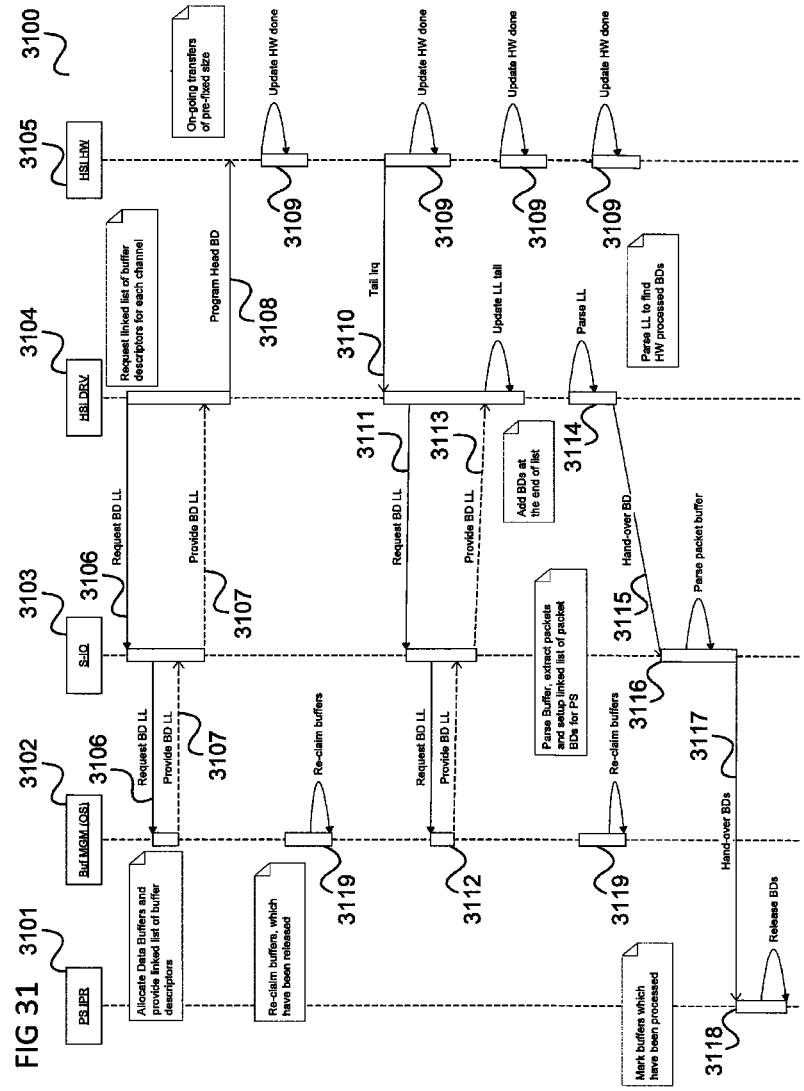

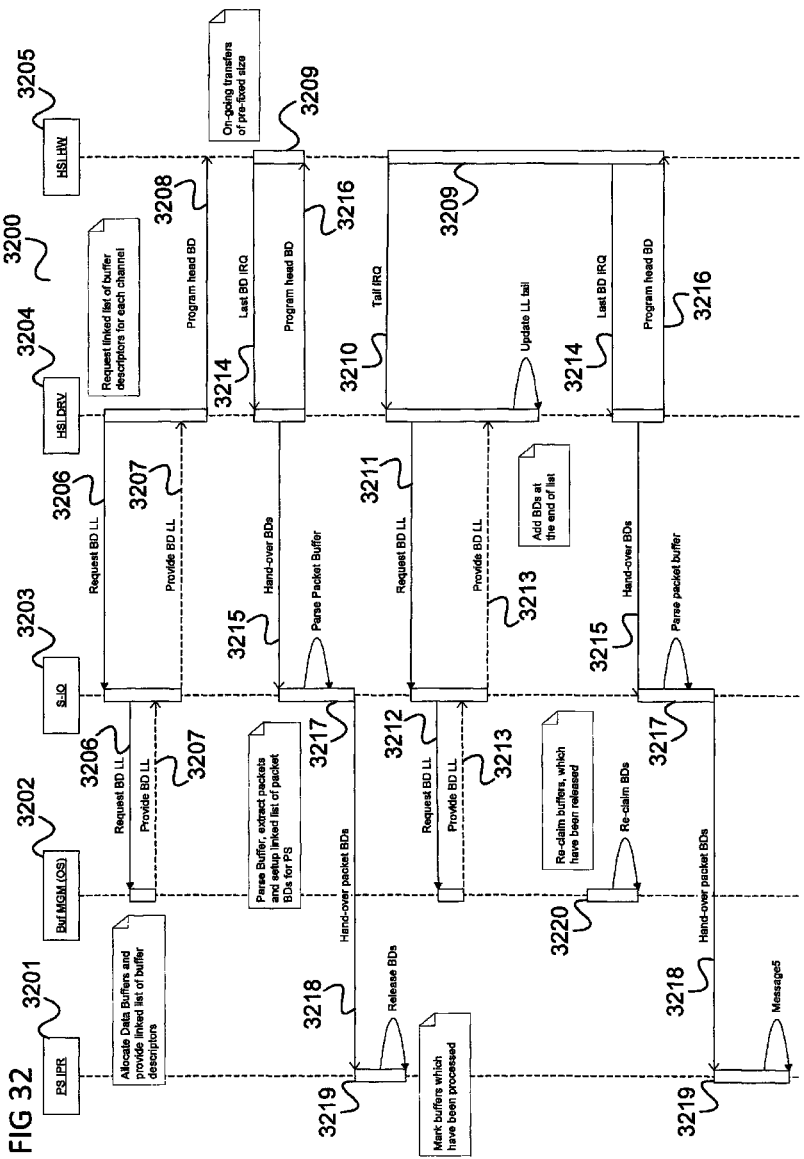

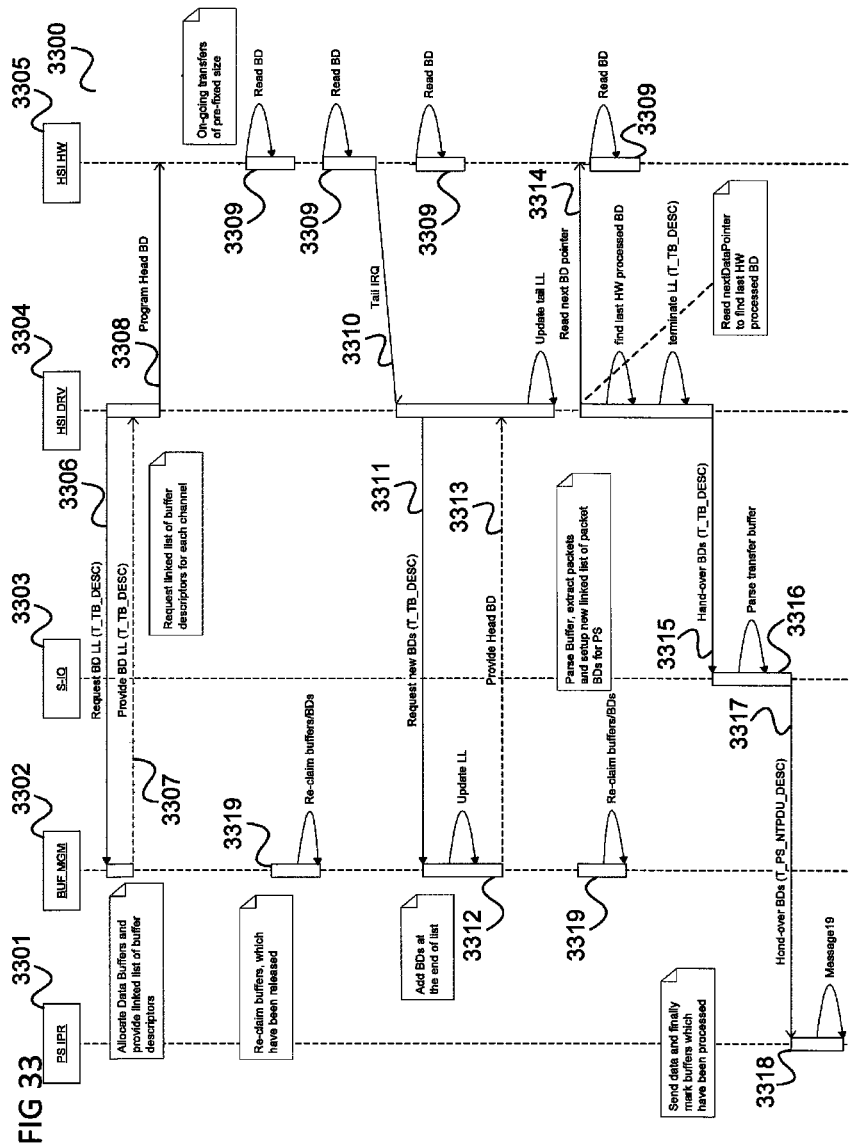

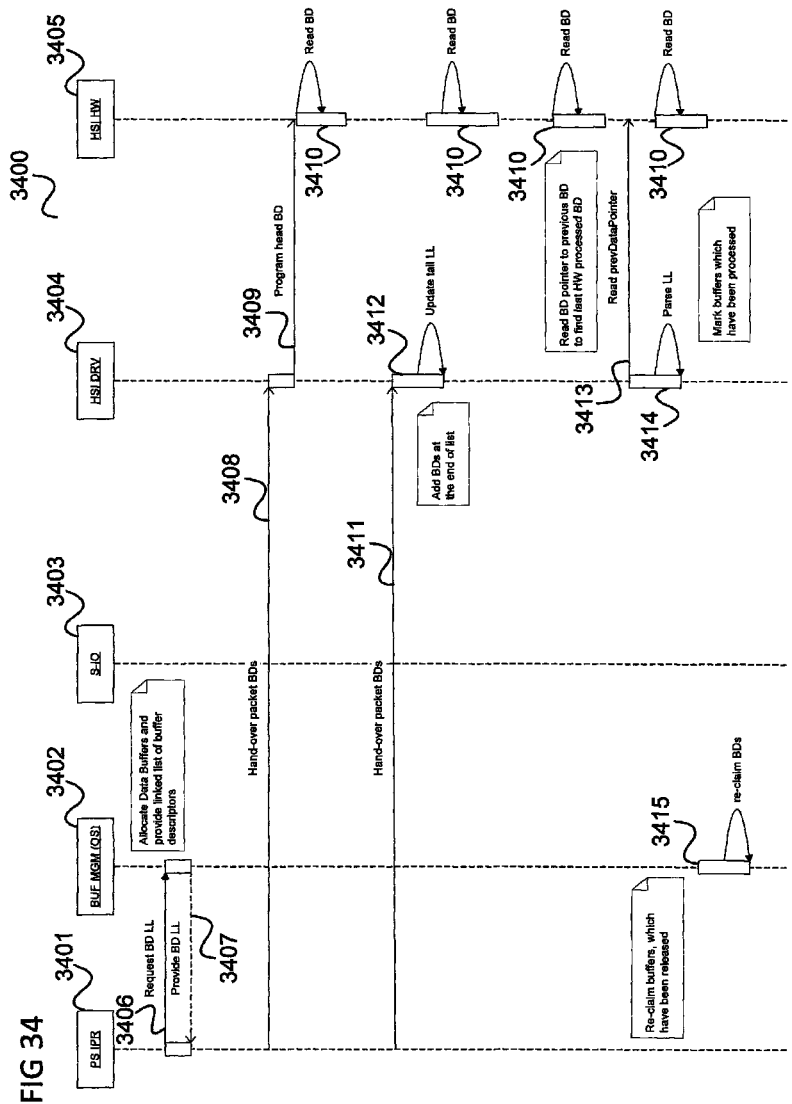

DATA PROCESSING DEVICE

TECHNICAL FIELD

The present disclosure relates to data processing devices.

BACKGROUND

In wireless communication systems, data typically needs to be exchanged between the modem and the application processor at high data rates. To allow such high data rates, it is desirable to have efficient data link layer protocols for the data exchange which for example allow exchanging data with low overhead in and with a low number of operations (e.g. memory operations and CPU operations).

SUMMARY

According to one aspect of this disclosure, a data processing device is provided including a controller configured to open a logical channel with another data processing device and a receiver configured to receive a message from the other data processing device specifying a data link layer protocol data unit size to be used for exchanging data via the logical channel and further including a transceiver configured to exchange data with the other data processing device over the logical channel in accordance with the data link layer protocol data unit size wherein the data link layer protocol data unit size is constant for the logical channel until the logical channel is closed.

According to another aspect of this disclosure, a data processing device is provided including a controller configured to open a logical channel with another data processing device and a transmitter configured to send a message to the other data processing device specifying a data link layer protocol unit size to be used for exchanging data via the logical channel and further including a transceiver configured to exchange data with the other data processing device over the logical channel in accordance with the data link layer protocol data unit size wherein the data link layer protocol data unit size is constant until the logical channel is closed.

According to another aspect of this disclosure, a data processing device is provided including a generator configured to generate a data link layer packet data unit based on a data link layer header size required by another data processing device for transmitting a network layer packet such that the data link layer packet data unit includes at least one network layer packet and an unused part which has at least the indicated data link layer header size and which is arranged within the data link layer packet data unit at a position of a data link layer header of the network layer packet.

According to another aspect of this disclosure, a data processing device is provided including a transmitter configured to transmit a message to another data processing device indicating a data link layer header size required by the data processing device for transmitting a network layer packet and further including a receiver configured to receive a data link layer packet data unit from the other processing device including at least one network layer packet and an unused message part which has at least the indicated data link layer header size and which is arranged within the data link layer packet unit at a position of a data link layer header of the network layer packet.

According to another aspect of this disclosure, a data processing device is provided including a memory storing, for each network layer data block of a plurality of network layer data blocks, an indication whether an interrupt should be issued after the processing of the network layer data block and further including a processing element configured to process each network layer data block and to issue an interrupt after processing of the network layer block if the indication stored for the network layer data block indicates that an interrupt should be issued after the processing of the network layer data block.

According to other aspects of this disclosure, methods according to the data processing devices described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 30 shows a message flow diagram for synchronization by previous buffer pointer.

FIG. 31 shows a message flow diagram for synchronization by semaphore.

FIG. 32 shows a message flow diagram for synchronization by interrupt.

FIG. 33 shows a message flow diagram for synchronization by next pointer.

FIG. 34 shows a message flow diagram for synchronization by previous pointer.

DESCRIPTION

Figure 1:
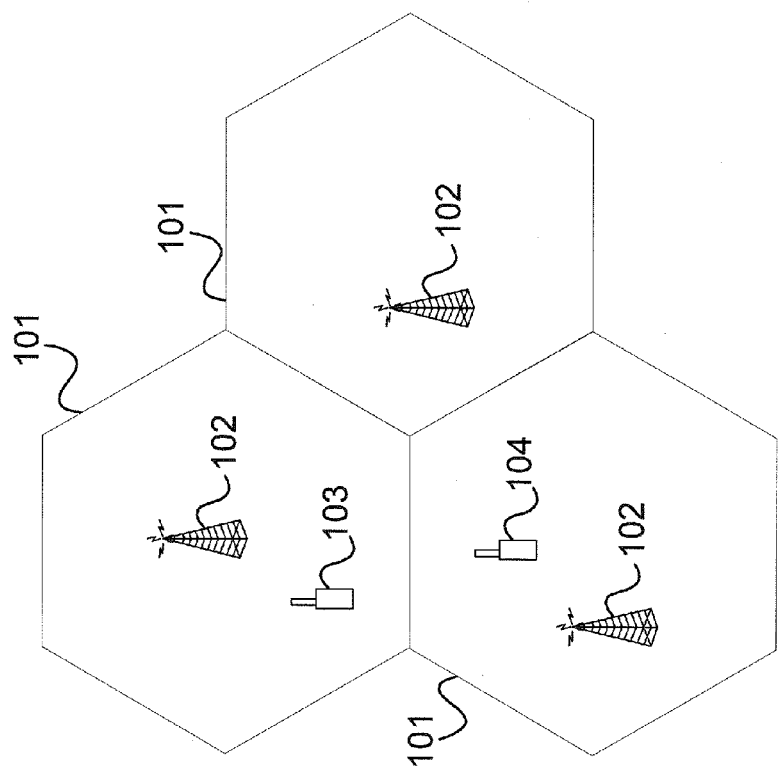
FIG. 1 shows a communication arrangement.

The following detailed description refers to the accompanying drawings that show, by way of illustration, specific details and aspects of this disclosure in which the aspects may be practiced. These aspects of this disclosure are described in sufficient detail to enable those skilled in the art to practice the aspects. Other aspects of this disclosure may be utilized and structural, logical, and electrical changes may be made without departing from the scope of the aspects. The various aspects of this disclosure are not necessarily mutually exclusive, as some aspects of this disclosure can be combined with one or more other aspects of this disclosure to form new aspects.

A data link layer protocol for a data exchange between a modem and an application processor in a wireless communication device may be based on protocol handshake around each PDU transmission, single PDU transmission without PDU framing format and transmission of variable size PDUs.

However, regarding protocol handshake, an exchange of control messages before and after each PDU transmission lowers available bandwidth due to required bandwidth for transmission of control messages. Usually the data link layer protocol is handled in software (SW). SW processing of the control messages may result in interrupt processing for each control message which means SW latencies related to costly context switches at a real time processing system on modem side. The SW processing for each control message does not only increase the CPU load but lowers at the same time the achievable throughput due to the processing latencies. Taking two interrupts for each PDU and a maximum IP packet size of 1.5 kBytes at 100 Mbps downlink rate into account (as required by LTE (Long Term Evolution) the resulting interrupt load is roughly 17000 IRQs/s. This interrupt load is far beyond the feasible limit for CPUs of today's cellular modems.

Regarding single PDU transmission without PDU framing format it should be noted that either a single IP packet may be transferred per PDU or multiple IP packets may be transferred in one PDU in a streaming format having an IP packet directly followed by the next IP packet. Transmission of single IP packets per PDU is limiting the net throughput. Taking into account a SW latency of around 100 us for processing of each of the two IRQs per PDU the net throughput, e.g. for a physical MIPI HSI link of 200 Mbps, is only about 46 Mbps, i.e. below 25%. Transferring multiple IP packets per PDU is increasing the link efficiency. However, the IP packets are usually not available in a continuous memory location without having gaps between the packets. In this case, forming a PDU out of multiple IP packets may require to copy first IP packets from various memory locations to a continuous location. Memory copy operations are then required which overload the available memory bandwidth of today's cellular modems. According to one aspect of this disclosure, a more efficient implementation is achieved by using a scatter gather DMA (direct memory access).

Regarding transmission of variable size PDUs, it should be noted that having each PDU of variable size which is only known just in time by the receiver may prevent the receiver from preparing buffers for PDU reception in an efficient manner. Memory allocation can typically only take place just before each reception of a PDU. The memory allocation operation specific to each PDU is putting additional load to the CPU. Furthermore, having to support a flexible PDU size results a complex memory management scheme required to allow efficient usage of limited system memory.

According to one aspect of this disclosure efficient inter processor communication, for example between a LTE enabled cellular modem and an application processor for user data exceeding data rates of 100 Mbps, is provided. For example, a data link layer protocol and an efficient implementation on top of the MIPI HSI physical layer is provided which supports the required throughput of 100 Mbps download and 50 Mbps upload of LTE, efficient usage of the net bandwidth with low protocol overhead, power efficient transmission and very low CPU performance requirements for processing of link layer protocol.

FIG. 1 shows a communication arrangement 100.

The communication arrangement 100 includes radio cells 101 wherein each radio cell 101 is operated by a respective base station 102. The base stations 102 are for example part of a radio access network of a mobile communication network. A mobile terminal 103 located in one of the radio cells 101 may communicate with the base station 102 operating the radio cell 101 (over the so-called air interface) and may thus be provided with a communication connection to another mobile terminal 104 located in the same radio cell 101 or a different radio cell 101 (or even a radio cell of another mobile communication network), a core network of the mobile communication network or other communication networks such as the Internet or other mobile communication networks.

The mobile communication network may be a cellular mobile communication network according to various standards. For example, the mobile communication network is a wireless communication system according to GSM (Global System for Mobile Communications), UMTS (Universal Mobile Telecommunications System) or LTE (Long Term Evolution).

The mobile communication network may also be a local area network or a metropolitan area network, e.g. according to a WLAN (Wireless Local Area Network) standard. The base stations 102 may in this case for example be access points. It should be noted that aspects of this disclosure may also be based on other communication networks (not necessarily being cellular) such as Bluetooth piconets etc.

The mobile terminal 103 may act as a receiver in case of downlink transmission (i.e. transmission from the base station 102 to the mobile terminal 103) and may act as a transmitter in case of uplink transmission (i.e. transmission from the mobile terminal 103 to the base station 102).

Figure 2:
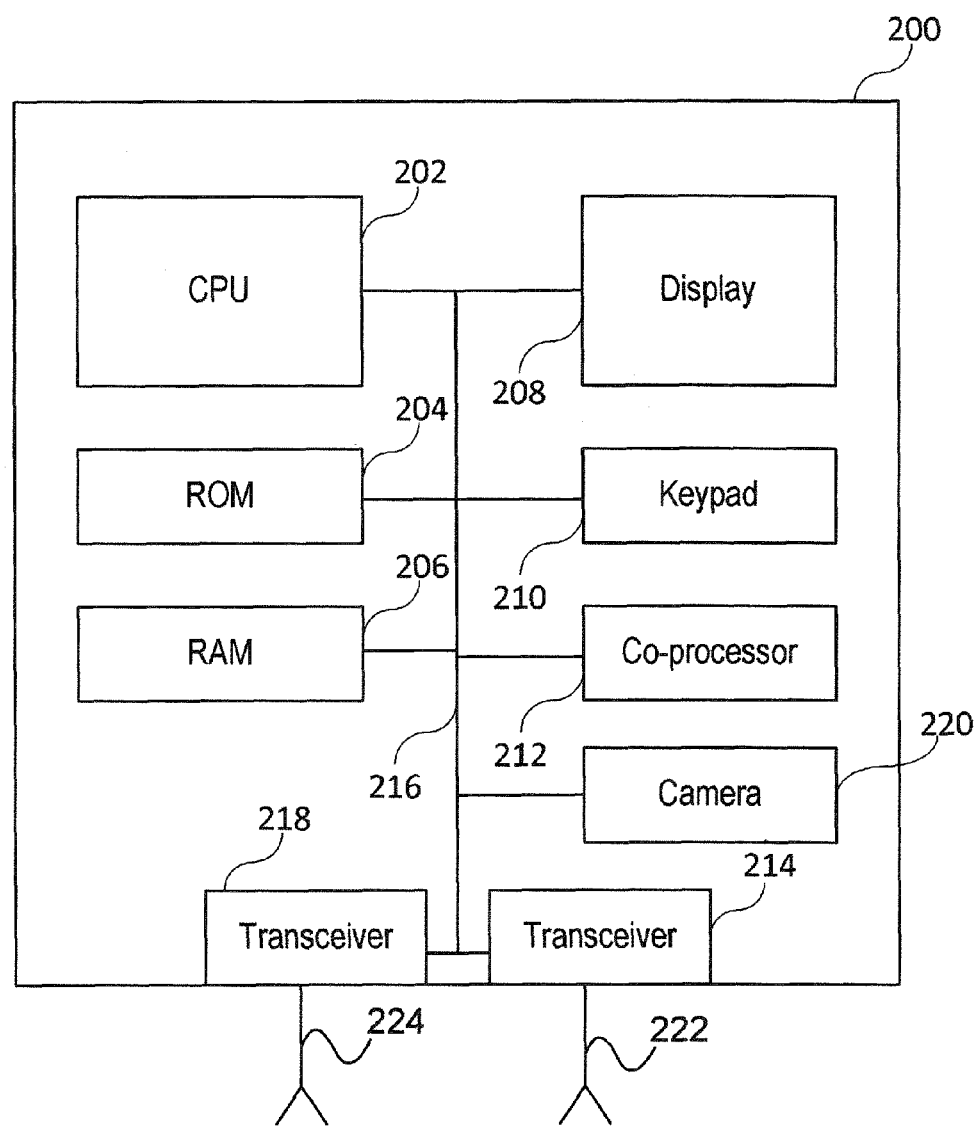
FIG. 2 shows a communication device, e.g. corresponding to the mobile communication device.

An example for a structure of the mobile terminal 103 is given in FIG. 2.

FIG. 2 shows a communication device 200, e.g. corresponding to the mobile communication device 201.

The communication device 200 may include a processor 202, such as e.g. a microprocessor (e.g. a central processing unit (CPU)) or any other type of programmable logic device (which may for example act as controller). Furthermore, the communication device 200 may include a first memory 204, e.g. a read only memory (ROM) 204 and/or a second memory 206, e.g. a random access memory (RAM) 206. Moreover, the communication device 200 may include a display 208 such as e.g. a touch sensitive display, e.g. a liquid crystal display (LCD) display or a light emitting diode (LED) display, or an organic light emitting diode (OLED) display. However, any other type of display may be provided as the display 208. The communication device 200 may in addition include any other suitable output device (not shown) such as e.g. a loudspeaker or a vibration actuator. The communication device 200 may include one or more input devices such as keypad 210 including a plurality of keys. The communication device 200 may in addition include any other suitable input device (not shown) such as e.g. a microphone, e.g. for speech control of the communication device 200. In case the display 208 is implemented as a touch sensitive display 208, the keypad 210 may be implemented by the touch sensitive display 208. Moreover, optionally, the communication device 200 may include a co-processor 212 to take processing load from the processor 202. Furthermore, the communication device 200 may include a plurality of transceivers 214, 218 which may be part of a communication circuit and which may allow the communication device 200 to use various radio access technologies for communicating. The above described components may be coupled with each other via one or more lines, e.g. implemented as a bus 216. The first memory 204 and/or the second memory 206 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 202 (and optionally the co-processor 212) may be stored in the first memory 204. Data (e.g. the messages received or to be transmitted via the first transceiver 214) to be processed by the processor 202 (and optionally the co-processor 212) may be stored in the second memory 206.

Each transceiver 214, 218 is coupled with one or more respective antennas 222, 224 used by the transceiver 214, 218 to transmit and receive radio signals. The communication device 200 and one or more of the transceivers 214, 218 may also be configured to provide MIMO radio transmission.

Moreover, the communication device 200 may include a still image and/or video camera 220, configured to provide a video conference via the communication device 200.

Furthermore, the communication device 200 may include a Subscriber Identity Module (SIM), e.g. a UMTS Subscriber Identity Module (USIM) identifying a user and subscriber 216 of the communication device 200 e.g. for usage of a cellular wide area communication network 103.

The processor 202 may include audio processing circuits such as e.g. an audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

For example, the first transceiver 214 is configured such that it implements an interface in accordance with a cellular radio communication system (such as UMTS or LTE). In this case, the first transceiver 214 for example corresponds to a communication chip or communication processor acting as cellular modem which may communicate with the CPU 202 (which acts as application processor, e.g. running applications and providing multimedia features). The communication between the communication processor and the application processor is also referred to as inter processor communication (IPC) and is illustrated in FIG. 3.

Figure 3:
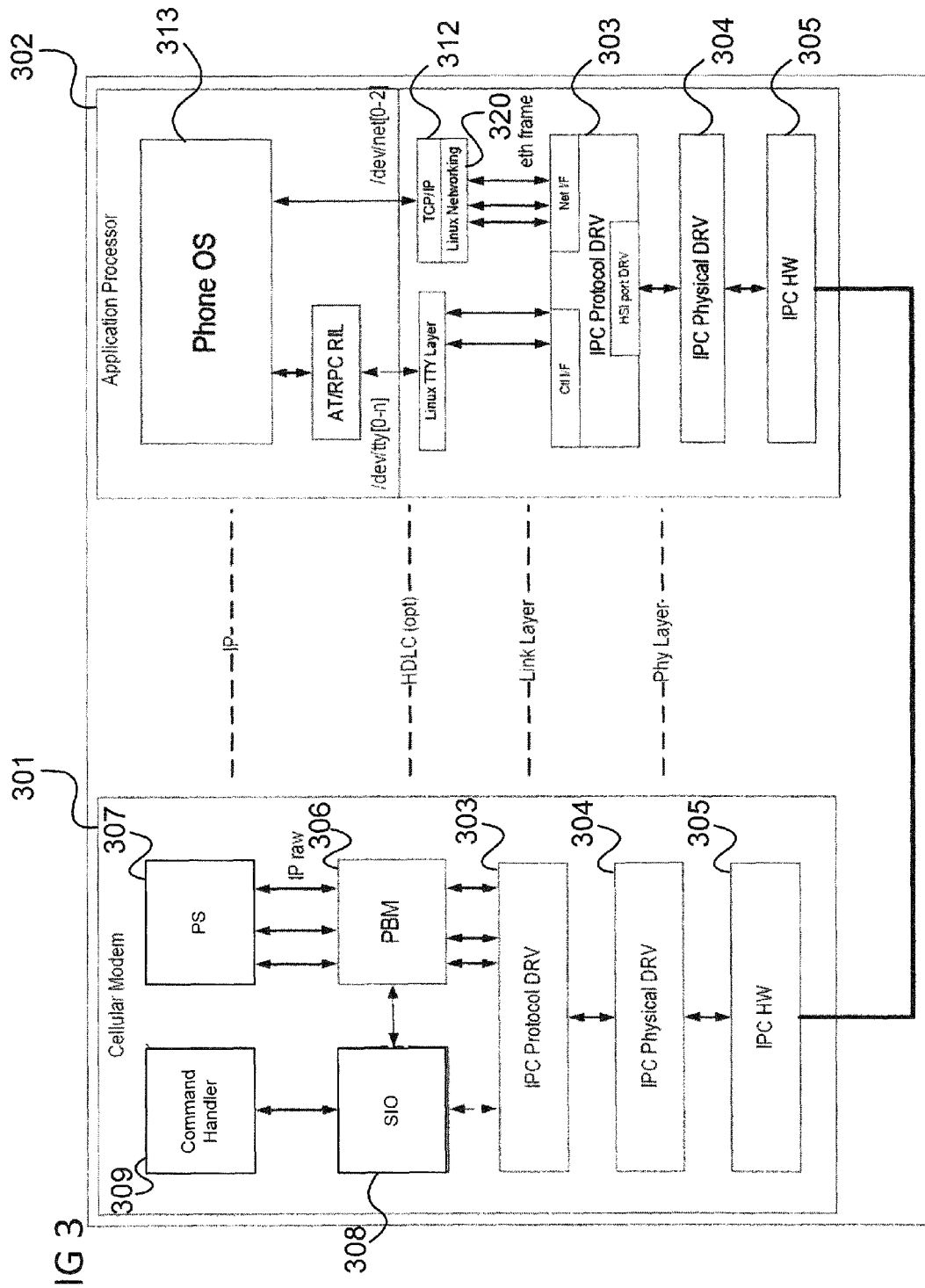
FIG. 3 shows a communication processor and an application processor.

FIG. 3 shows a communication processor 301 and an application processor 302.

The communication processor 301 acts as a cellular modem.

The communication processor 301 and the application processor 302 are connected by an IPC interface which is implemented by an IPC protocol driver 303, an IPC physical driver 304 and IPC hardware (HW) 305 which are present on both the application processor and communication processor side. It should be noted that the exchange of audio data as PCM (Pulse Code Modulation) samples may be handled by a separate interface.

In the communication processor 301 implements a cellular protocol stack (PS) 305, i.e. a protocol stack according to the cellular communication technology supported by the communication processor 301. User data is transferred from/to the cellular protocol stack (PS) to the IPC via a centralized memory manager which is called packet buffer manager (PBM) 306. The user data is routed along the data plane as IP packets using several logical channels. Each logical channel corresponds to a dedicated Packet Data Network (PDN) connection. The term PDN connection refers to a packet data connection to a specific Access Point Name (APN) which results in the assignment of a dedicated receiver IP address. In a 2G/3G network a PDN connection is established for each primary PDP context, while in a 4G network a default bearer is used for establishing the PDN connection. The term PDN connection is used as a general term to abstract from the specific Radio Access Technology (RAT) be it 2G, 3G or 4G.

There is no TCP/IP stack on the cellular modem side in the data path from the IPC interface 303, 304, 305 over PBM 306 to PS 305 handling IP address based routing.

The central packet buffer manager (PBM) 306 provides a common packet buffer used between the IPC interface and the protocol stack 307. No copy operation of data is necessary between the PS 305 and the IPC interface. The IPC interface provides DMA (Direct Memory Access) capabilities with scatter/gather linked-list processing. A highly efficient data path for high throughput is enabled by these means.

The control plane is using at least one dedicated channel through a serial 10 (Input output) handler (S-IO) 308 to an AT (attention) command handler 309. The S-IO handler 308 implements TX (transmission) and RX (reception ring buffers) serviced via dedicated interfaces towards drivers and applications. The application is in this case the AT command handler 309. The control channel is using AT commands. Alternatively, remote procedure calls based on function calls can be routed along the same way to an RPC (Remote Procedure Call) client on the cellular modem side.

The IPC interface is built-on the three major components:
IPC HW blocks 305
IPC physical driver 304 servicing the hardware
IPC protocol driver 303 providing data link layer and MAC functionality.

The control and data flow of the IPC interface is independent from the hardware solution and the IPC protocol. According to one aspect of this disclosure, the communication processor 301 supports a serial IPC connection via three interfaces:

MIPI (Mobile Industry Processor Interface) High-Speed Serial Interface (HSI)

USB (Universal Serial Bus) High Speed Inter-chip Interface (HSIC)

USB 2.0 High Speed (HS)

For example, only one of these interfaces is used in the mobile terminal 103. For example, simultaneous operation of MIPI HSI, USB HSIC or USB HS interface for IPC is not intended.

Figure 4:
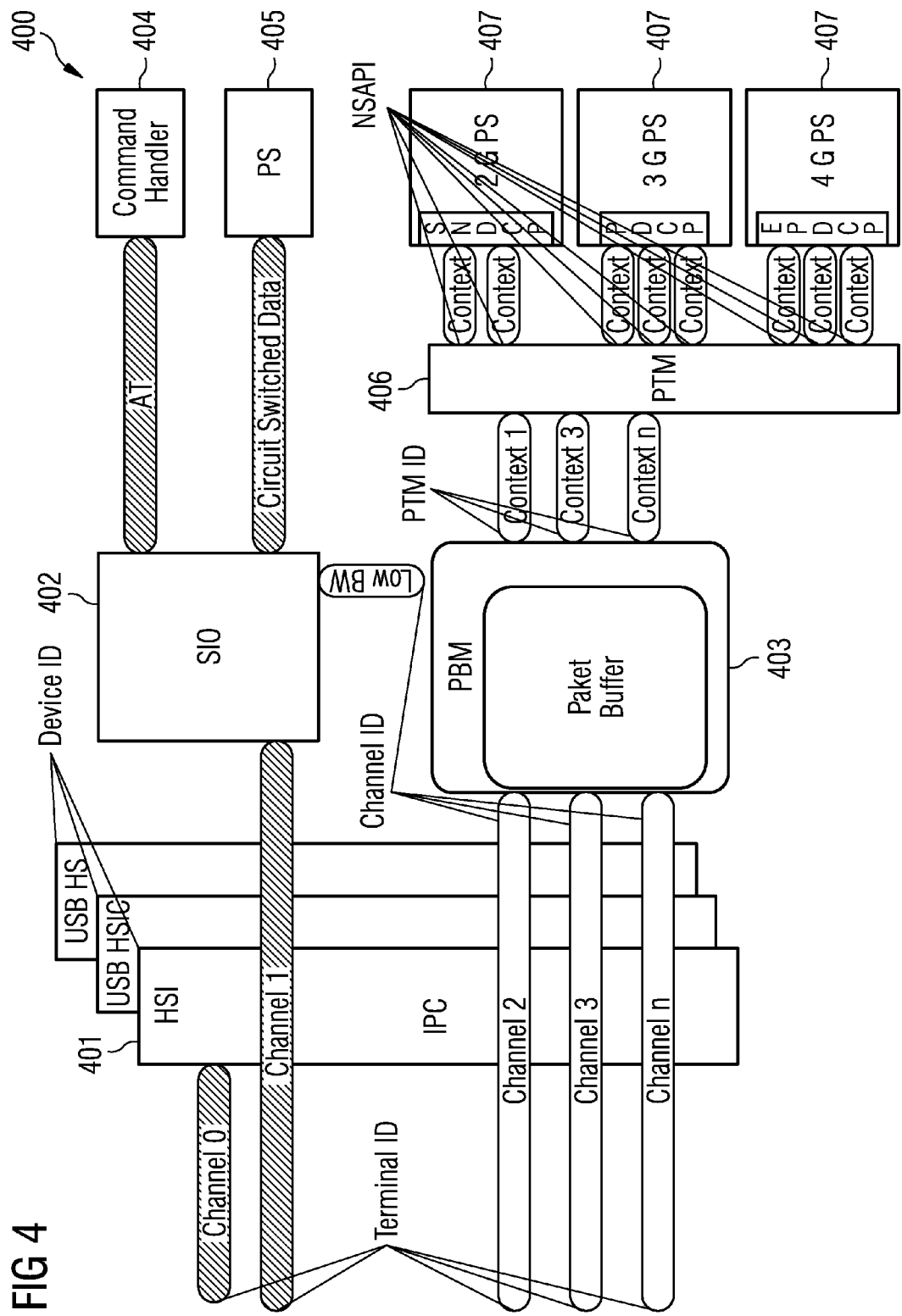
FIG. 4 shows the data path in a cellular modem.

A more detailed view on routing over logical channels of the IPC interface on the cellular modem side is given in FIG. 4.

FIG. 4 shows the data path in a cellular modem 400.

The cellular modem 400 includes an IPC interface 401 corresponding to IPC components 303, 304, 305, a S-IO 402 corresponding to S-IO 308, a PBM 403 corresponding to PBM 306, a command handler 404 corresponding to command handler 309 and a protocol stack 405 corresponding to command handler 309. The cellular modem 400 further includes a packet traffic manager 406 and a RAT module 407 for each supported cellular communication technology (these are not shown in FIG. 3).

Control channels (shown hatched) and data channels (shown without hatching) transport data to and from these components. The routing of the high bandwidth data path is managed by the Packet Buffer Manager (PBM) 403. The dynamic routing of an IPC logical channel (corresponding to a channel ID) to a context ID of PS (PTM ID) is handled by a router component of the PBM 403. The PBM clients 403 register at system start-up, the channels association for each PDN connection are handled with AT commands.

The PBM 403 provides a full abstraction of the specific IPC interface to the PS 405. The PBM 403 can be seen to be acting as a middleman.

Along similar lines the packet traffic manager (PTM) 406 supports an abstraction of the various RATs (provided by RAT modules 407) towards the rest of the system.

The control path and optional low bandwidth data are going via the S-IO module 402. The control path is used for call control and PDP context control. On application processor side control channels are accessible as serial ports providing a terminal interface via tty layer.

In should be noted that in the case of a MIPI HSI IPC interface the control path and optional low bandwidth data are going via the PBM 403 towards the S-IO 402 (not shown in FIG. 2). The IPC channel usage is configurable at compile time (e.g. with the exception of channel 0 used for IPC control).

The modem control on application level between the communication processor 301 modem and the application processor 302 is implemented using AT commands. In the context of an AT command based architecture a SW multiplexer can be added. The SW multiplexer provides a number of logical channels (DLC) which serve as AT terminals on AP side. These logical channels are mapped on-top of one of the control channels of the specific physical IPC interface. The multiplexer protocol is a data link protocol (layer 2 of the OSI model) which uses HDLC (high level data link control)-like framing, virtual data channels, and channels' control procedure. The allows software applications on the application processor 302 to access the communication processor 301 in a concurrent way by emulating multiple virtual communication channels. The MUX protocol controls the virtual channels and conveys user data over the virtual channels. Typical data generated by user applications are AT commands for call control, supplementary services.

SMS, SIM toolkit, driver and accessory control, etc.

Circuit switched data

MUX channel allocation

An example for a default of DLCs (Data Link Connections) is given in table 1.

TABLE 1

| DLC0 | Mux control channel |
|------|---------------------|
| DLC1 | Call Control Commands - AT cmds |
| DLC2 | CSD (circuit switched data/multimedia calls) |
| DLC3-5 | Low-bandwidth PDN connection establishment and data |
| DLC6 | Call Settings, Phonebook, SMS, SIMTK |
| DLC7 | Free |
| DLC8 | XDRV, SYSTEM - Audio management |
| DLC9 | Location services - A-GPS |
| DLC10 | Free |
| DLC11 | CIQ |

The data channels terminate at AP side as network interfaces 320 entering a network protocol stack 312 (e.g. TCP/IP stack).

Each PDN connection terminates as a separate network interface 320 with a dedicated IP address at application processor side. A PDN connection corresponds to a primary PDP context for a UMTS communication system or a default bearer for an LTE communication network. User data of a secondary PDP context or a dedicated bearer is routed over the same IPC channel as the corresponding primary PDP context or default bearer.

The PBM 306 supports common buffer management between protocol stack 307 and the IPC interface. The PBM 306 allocates a memory pool from the operating system 313, running on the application processor 302, at start-up of the mobile terminal 103. Out of this memory pool the PBM 306 services buffer requests from the IPC interface or the protocol stack 307. No OS-level memory allocation is needed after start-up. The PBM 306 provides packet buffers and related buffer descriptors to protocol stack 307 and IPC interface.

There are two kinds of buffers and related buffer descriptors: Transfer buffer/descriptor (TB/TD) and Segment buffer/descriptor (SB/SD).

A transfer buffer is the elementary unit of IPC transfer, i.e. the PDU (Physical Data Unit) which is transmitted as elementary unit over the physical lines of the IPC interface. A transfer buffer contains a collection of IP packets. A transfer buffer is described via a Transfer Buffer Descriptor (TD).

A Segment descriptor (SD) points to a single packet. The packet can be part of a Transfer Buffer in uplink (UL) or in a separate buffer on its own in downlink (DL).

By transferring several IP packets in a single large IPC transfer a data path with minimum SW interaction is enabled. On HW side the IPC controllers traverse autonomously linked-list of buffer descriptors thanks to in-build Scatter/gather linked-list DMA capabilities.

Figure 5:
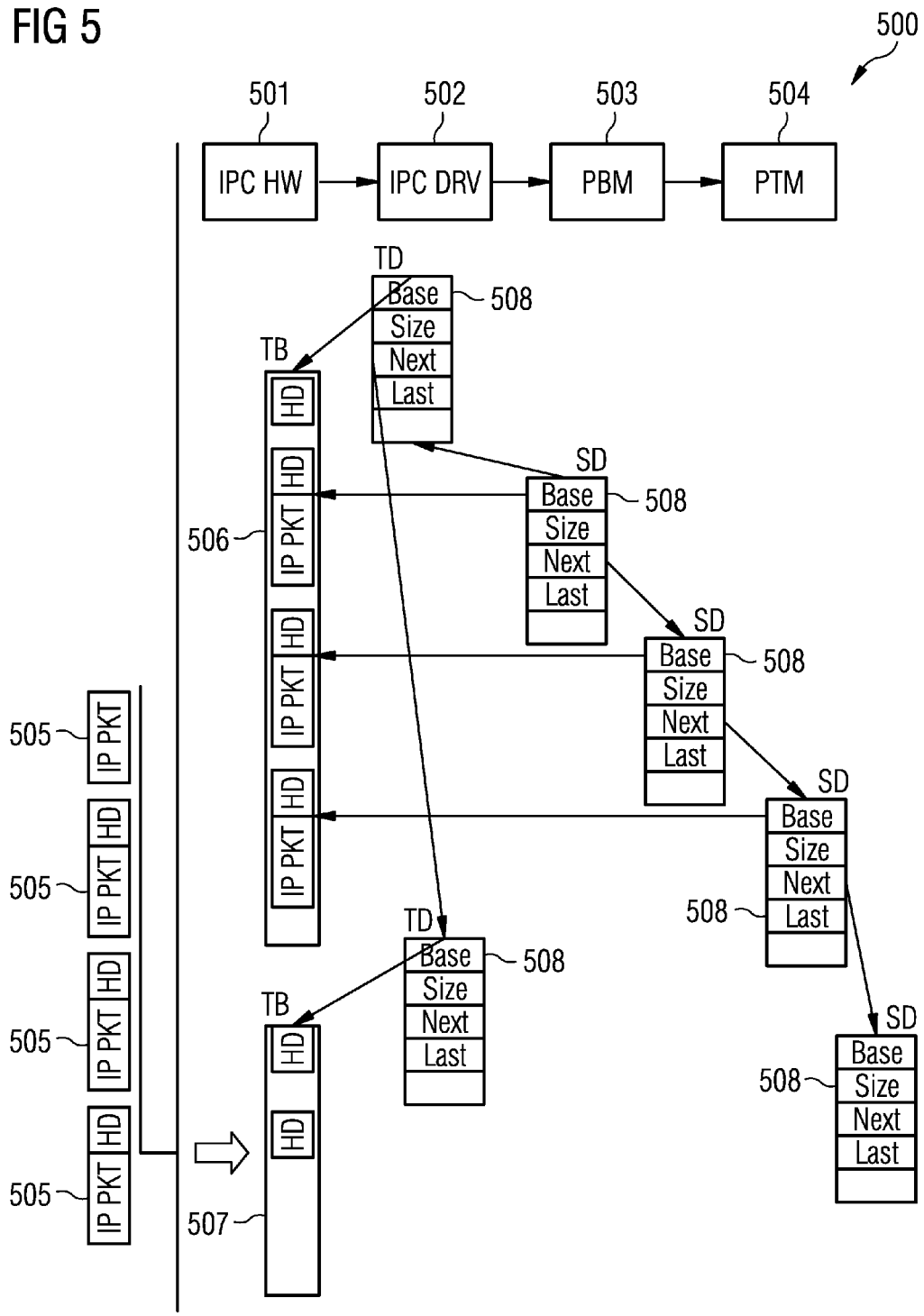
FIG. 5 shows a message flow diagram for UL transmission.

The data path related processing in UL direction from the application processor 302 to the communication processor 301 is illustrated in FIG. 5.

FIG. 5 shows a message flow diagram 500 for UL transmission.

The message flow takes place between IPC hardware 501, for example corresponding to the IPC hardware 305 of the communication processor 301, an IPC driver 502, for example corresponding to IPC physical driver 304 and IPC protocol driver 303 of the communication processor 301, a PBM 503 for example corresponding to PBM 306, 403 and a PTM 504 for example corresponding to PTM 504.

From left to right IP packets 505 are entering the communication processor over the physical lines. The IP packets 505 are part of an IPC transfer. Each transfer is stored by the IPC hardware component 501 in a pre-allocated transfer buffer (TB) 506, 507. Whenever a transfer buffer 506 has been completely filled by the IPC hardware 501 this is signaled to the IPC driver 502 via an interrupt service. In this example, two transfer buffers 506, 507 are shown. The lower transfer buffer 507 is currently filled by the IPC hardware 501 while the upper transfer buffer 506 has been already handed-over to the IPC driver 502.

The IPC driver 502 parses the received transfer buffer 506 and updates a segment descriptor (SD) 508 for each packet which is present in the transfer buffer 506. The processing results in a linked list of segment descriptors 508 for each transfer buffer 506, 507. The list of segment descriptors 508 is finally handed over via the 503 PBM to the PTM 504 for sending to the network side (i.e. a base station 102) of the cellular communication network.

Figure 6:
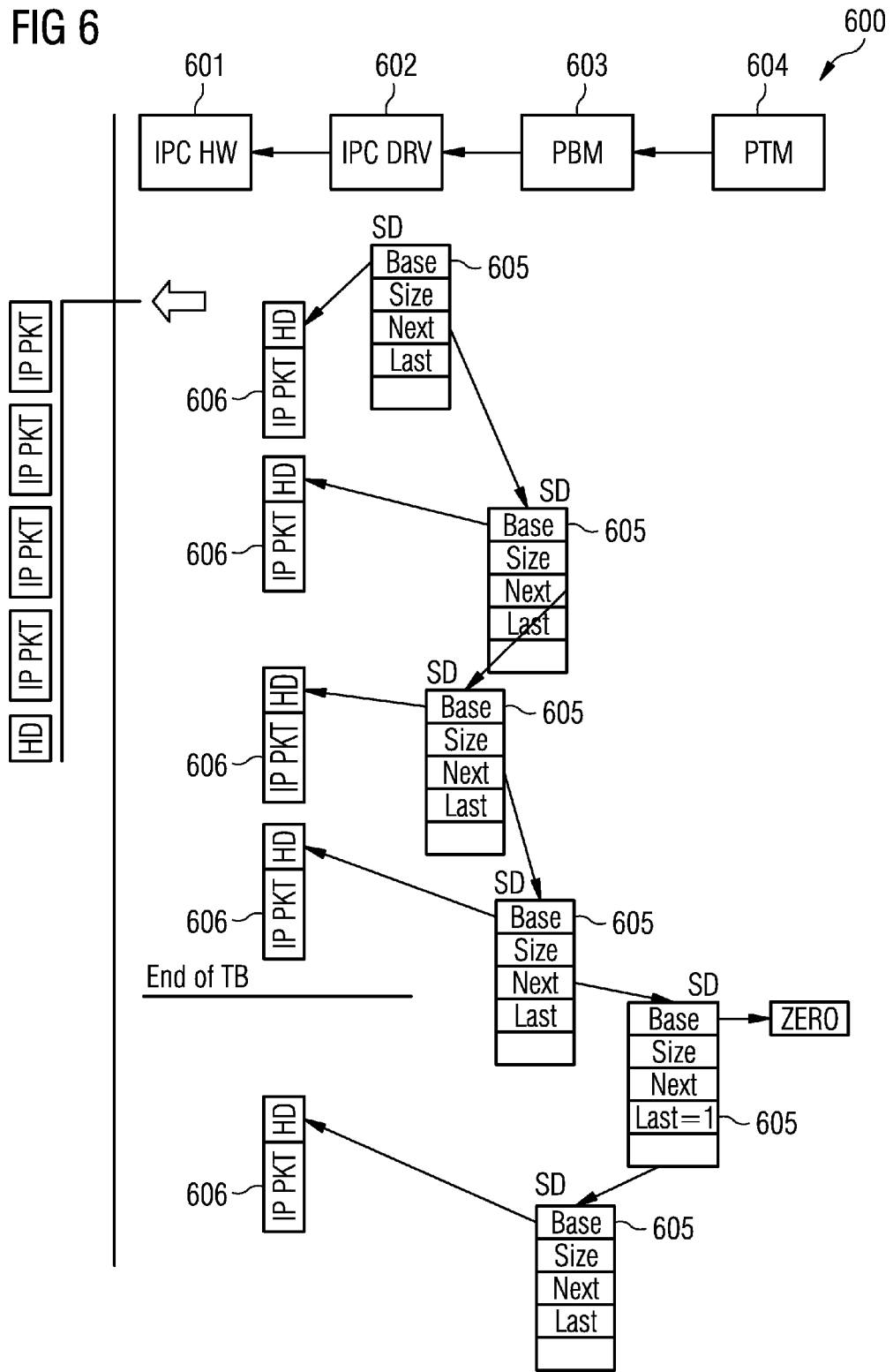
FIG. 6 shows a message flow diagram for DL transmission.

The data path related processing in DL direction from the communication processor 301 to the application processor 302 is illustrated in FIG. 6.

FIG. 6 shows a message flow diagram 600 for DL transmission.

The message flow takes place between IPC hardware 601, for example corresponding to the IPC hardware 305 of the communication processor 301, an IPC driver 602, for example corresponding to IPC physical driver 304 and IPC protocol driver 303 of the communication processor 301, a PBM 603 for example corresponding to PBM 306, 403 and a PTM 604 for example corresponding to PTM 504.

The IPC driver 601 receives a linked list of segment descriptors 605 from the PTM 504 via the PBM 503. Each segment descriptor 603 points to an IP packet 606 which has been received from a base station 102 of the cellular communication network. The IPC driver 602 parses the length of each packet given by the segment descriptors 605. Based on the length information the IPC driver 602 formats an IPC Transfer. The formatting includes a compilation of a transfer header and adding of a segment descriptor for ZERO padding at the end of the transfer.

Finally the IPC driver 602 (e.g. an IPC descriptor) programs the IPC hardware 601 with the first segment descriptor to be send out for a specific transfer. The IPC hardware 601 process the linked list of segments descriptors 505 autonomously sending out all data from the related segment buffers (SB) 505.

Figure 7:
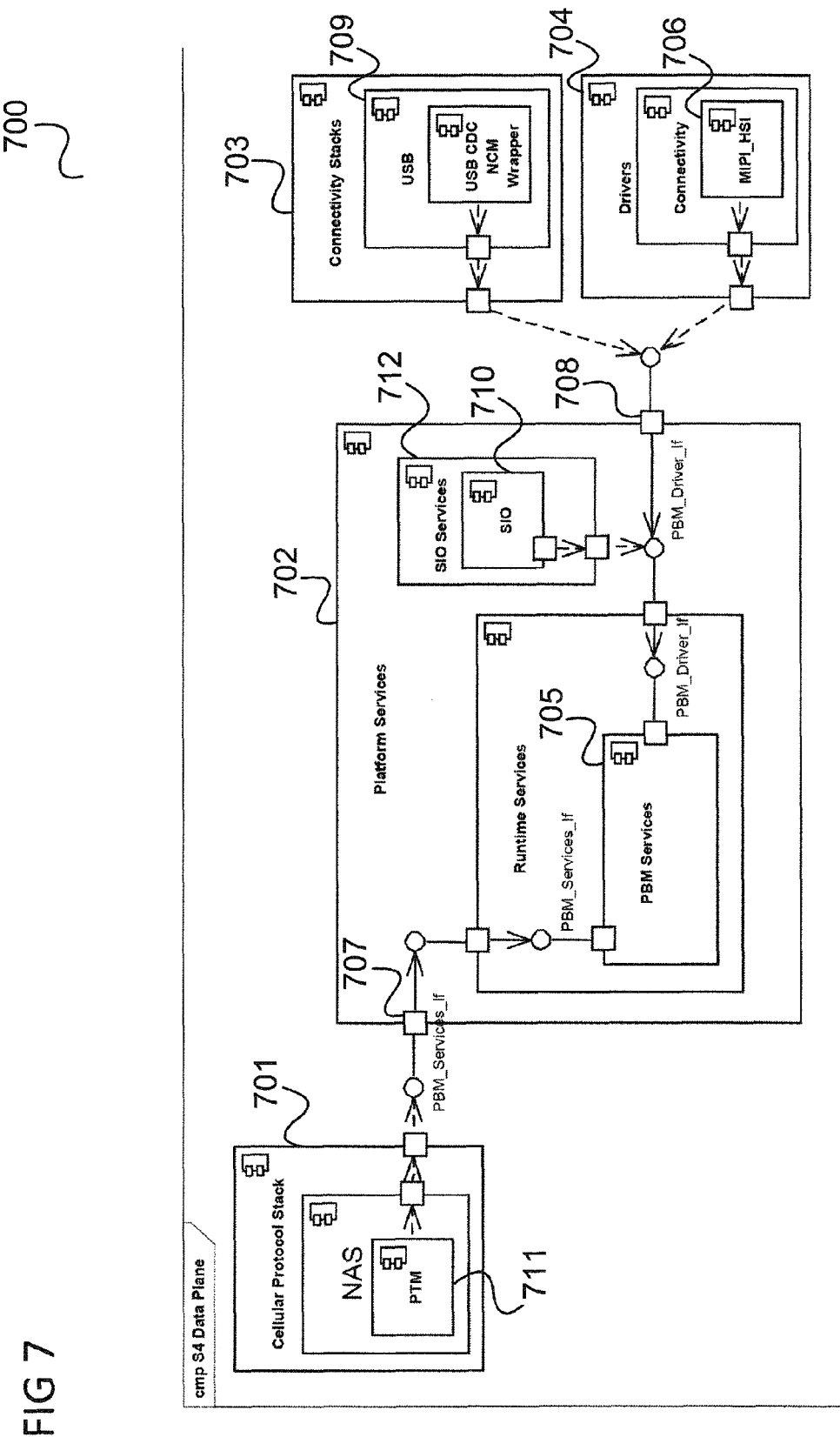
FIG. 7 shows a software architecture for the data plane.

The overall software architecture of the data plane according to one aspect of this disclosure is shown FIG. 7.

FIG. 7 shows a software architecture 700 for the data plane.

The software architecture 700 includes a cellular protocol stack 701 corresponding to protocol stack 307 including as part of the NAS (Non-Access Stratum) an implementation of a PTM 711 corresponding to PTM 406, platform services 702 including, as runtime services, PDM services 705 for example corresponding to the PBM 506 and including as SIO services 712 an implementation of a S-IO 710 corresponding to S-IO 308, connectivity stacks 503 including an USB stack 509 and drivers 504 including, as connectivity driver, a MIPI_HSI driver 506 for a MIPI HSI interface which, according to one aspect of this disclosure, is used as the IPC interface.

In FIG. 7 it is illustrated how the PS 507, the PBM 506 and the IPC interact. The context diagram shown in FIG. 7 is a high level diagram showing the components as whole with their inputs and outputs from/to other software components. The PBM component 705 is providing a service interface 707 to PS 501 and a driver interface 708 to the IPC components MIPI HSI driver 706 and USB stack 709.

The PBM's task is memory management. It provides services for allocation and freeing of buffers and the associated descriptors for transfer and segments buffers. The PBM 705 provides allocation and freeing of transfer and segments buffers. In UL a transfer buffer 506, 507 holds usually multiple IP packets and a segment descriptor 508 is associated to each IP packet 505 in a transfer buffer 506, 507. In DL each segment descriptor 605 is associated to an IP packet 606 in a dedicated segment buffer.

The second service of the PBM 705 is to support packet routing. The PBM 705 is concerned with the registration of clients: PTM, USB HS, USB HSIC, MIPI HSI, and S-IO. It handles the ID mapping from the device ID of a driver to channel ID of IPC and PTM ID of PTM from PS as shown in FIG. 4. Based on the routing information the PBM 705 manages the hand-over of descriptors from one side to the other. Furthermore the PBM 705 supports UL flow control initiated by the PTM 711 by restricting in a flow control situation the access to new buffers.

The PTM 711 provides services for IP packet routing and filtering. It generates IP packet lists per NSAPI (Network Service Access Point Identifier) according to a traffic flow template, provides the PTM ID to NSAPI mapping and performs TCP ACK prioritization in UL direction. In UL the PTM 711 provides tracking of data buffer status for reporting to cellular network and for flow control decision. The UL data flow control decision is based on buffer status and based on current data transfer state/rate.

The clients USB HS, USB HSIC, MIPI HSI and S-IO use services of the PBM 705 to process linked-list of user data.

In UL processing the IPC components provide the following operations:
 Requests transfer buffer (TB) from PBM 705
 Requests transfer and segment descriptors from PBM 705
 Parses transfer buffer received via IPC HW 305
 Constructs IP packet related segment descriptor list per TB 506
 Passes list to PBM 705 to be routed to PS 701

In DL processing the IPC components provide the following operations:
 Receive IP packets from PBM 705 as linked list of segment descriptors from PS 701
 Format linked list of IP packets per transfer
 Delivers lists to IPC hardware module 505
 Release indication for segment descriptors to PBM An example for the underlying hardware for the IPC architecture as illustrated in FIG. 3 is shown in FIG. 8.

Figure 8:
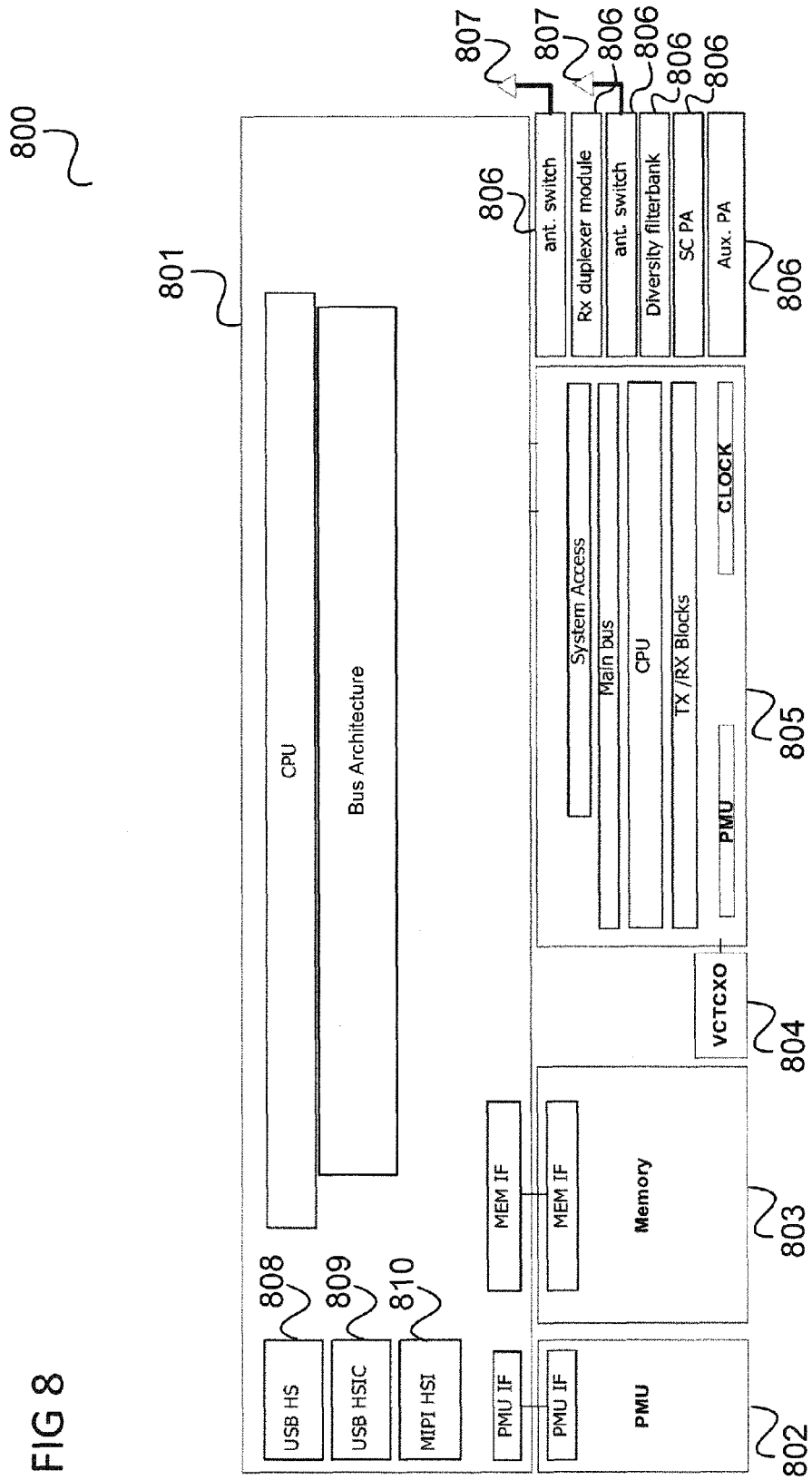
FIG. 8 shows a communication processor.

FIG. 8 shows a communication processor 800.

The communication processor 800 includes a processing component 801, e.g. a baseband chip, a power management unit 802, a memory 803, an oscillator 804, a transceiver component 805 and front end components 806 coupled to antennas 807.

In this example, several interfaces to the application processor 302 are supported:
 USB 2.0 HS
 USB HSIC
 MIPI HSI Corresponding interface components 808, 809, 810 are provided in the processing element 801.

All three of the supported IPC interfaces may provide in-build DMA capabilities with scatter/gather linked-list processing. A highly efficient data path is enabled for high-throughput by these means.

According to one aspect of this disclosure, only one of the supported interfaces to the application processor 302 is used. In the following, it is assumed that the MIPI HSI interface is used and that the MIPI HSI component 810 is coupled to a corresponding MIPI HSI component of the application processor 302 to provide the IPC interface.

Figure 9:
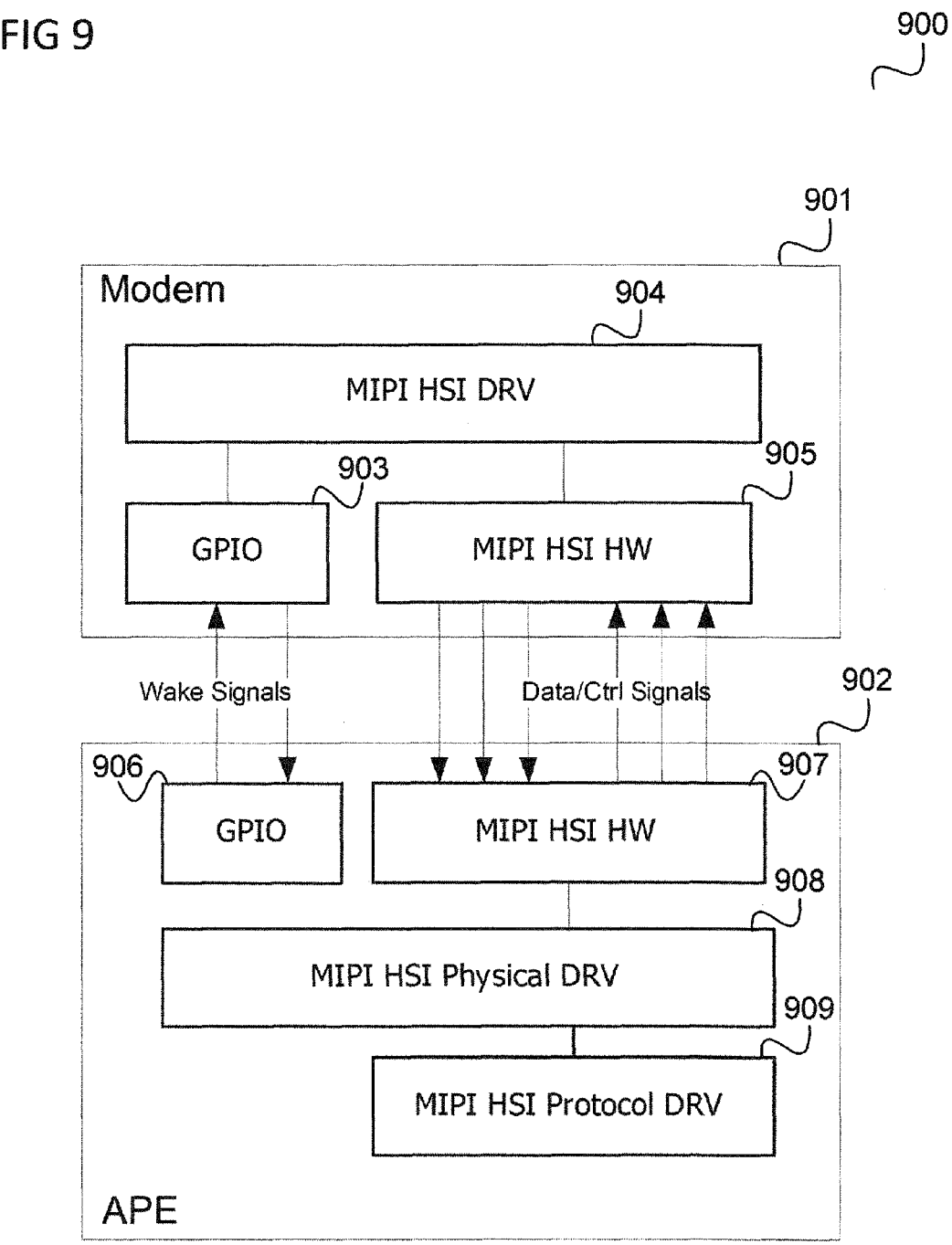
FIG. 9 shows an interface architecture.

An implementation of the IPC interface as MIPI HSI is illustrated in FIG. 9.

FIG. 9 shows an interface architecture 900.

The architecture includes components located in a cellular modem 901 (corresponding to cellular modem 301) and components located in an application processor 901 (corresponding to application processor 302).

On the modem side, a GPIO (General Purpose Input/Output) component 903, a MIPI HSI driver 904 (for example corresponding to IPC physical and/or protocol drivers 303, 304) and MIPI HSI hardware 905 (corresponding to IPC hardware 305) are provided.

On the application processor side, a GPIO (General Purpose Input/Output) component 906, MIPI HSI hardware 907 (corresponding to IPC hardware 305), a MIPI HSI physical driver 908 (for example corresponding to IPC physical driver 304) and a MIPI HSI protocol driver 909 (for example corresponding to IPC protocol driver 305) are provided.

The components of the modem side for example correspond to the MIPI HSI component 810 of the processing component 801.

The MIPI HSI driver 904 sits on top of the MIPI HSI hardware 905 (e.g. an interface controller). In this example the MIPI HSI driver 904 is software implementing the HW driver 305 and the protocol driver 304 in a single component.

The MIPI High Speed Serial Interface (HSI) is intended for interfacing to an application processor. According to one aspect of this disclosure, the MIPI HSI component 810 supports the following features:
- Compliant to MIPI HSI Physical Layer Specification
- Synchronized, Pipelined and Receiver Real-time data flows
- Stream and Frame Bit Transmission modes
- Supports 16 receive and 16 transmit channels
- Supports transmit speed up to 208 Mbps
- Source synchronous receiver implementation supporting receiving speed up to 230 Mbps
- Wake-up support
- Receiver supports wake-up with and without ACWAKE signal
- Operates with standard 1.2 V and 1.8 V JO pads A data link layer protocol according used by the MIPI HSI component 810 is described further below.

The MIPI HSI component 810 may for example use an interface from the S-IO 710 (implemented by S-IO services 712) and an interface from PBM. It has dependencies to drivers components, operating system and MIPI HSI hardware (for example part of chip implementing processing component 801).

The MIPI HSI SW concept is restricted to peer to peer communication. The SW protocol is based on the MIPI Alliance Specification for High-Speed Synchronous Interface (HSI), Physical Layer.

Examples for data link protocol commands supported by the IPC interface (e.g. the processing element 801) are described further below.

The MIPI HSI interface supports a variable number of IPC channels: from a minimum of 2 channels up to 16 channels can be activated. The step size is 2, 4, 8 and 16. Furthermore the MIPI HSI operation is configurable in terms of data link layer capabilities and physical layer operations.

One MIPI HSI channel is available to be used as interface for AT commands. The control channel is connected to PBM 306 driver interface and from there via S-IO 308 to the application on modem side. The logical channel is connected out via S-IO 308 to the PBM 306 using the PBM driver interface.

Up to 14 MIPI HSI channels are available to be used as interface for network connections or other application services. The data channels are connected via the PBM driver interface to the PBM 306 and from there via PBM service interfaces to the PTM component 711 of the PS 701.

After power-up or reset of the mobile terminal 103 the MIPI HSI based IPC interface provides an indication to the application processor that the modem control path is up and running and IPC communication can start via IPC. The events after start-up are illustrated in FIG. 10.

Figure 10:
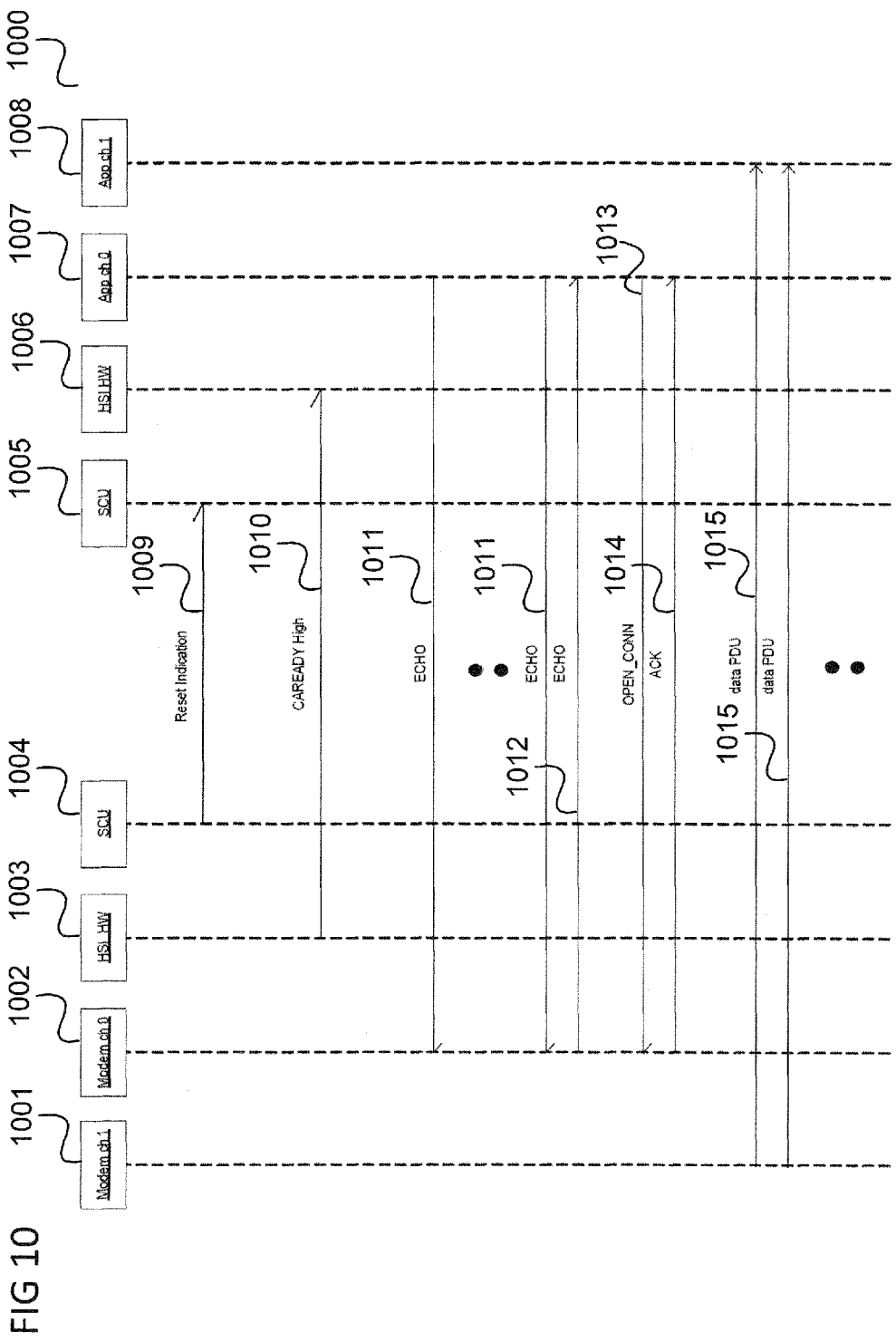
FIG. 10 shows a flow diagram related to mode-application processor communication start-up.

FIG. 10 shows a flow diagram 1000 related to mode-application processor communication start-up.

In this example, it is assumed that two channels are used with corresponding entities 1001, 1002 at the modem side and corresponding entities 1007, 1008 at the application processor side. Further, HSI HW 1003 on the modem side, HSI HW 1006 on the application processor side and SCUs 1004, 1005 on the modem and application processor side are involved in the flow.

In 1009, a of the communication processor 301 is indicated.

In 1010 CAREADY signal of MIPI HSI going to high to indicate that MIPI HSI HW 903 is ready to receive one HSI frame.

In 1011 a reply to an ECHO data link layer command is sent by the application processor 302. An ECHO reply by the communication processor 302 indicates that the MIPI HSI driver is operational. The application processor 302 re-sends ECHO data link layer commands repeatedly until it is answered in 1012 by an ECHO data link layer command from the modem side.

In 1013, the application processor 302 sends an OPEN_CONNECT or OPEN_CONNECT_OCTET command to the modem 301.

In 1014, an ACK response indicates that on the receiver side the complete path from IPC over S-IO and PBM towards final destination is operational. On the modem side the ACK data link layer response is gated with reception of ready event from command handler application indicating that the control plane is operational. The communication processor 301 is ready to start communication over the IPC for communicating PDUs in 1015.

The application processor 302 tolerates a certain latency for the response to the ECHO and OPEN_CONNECT or OPEN_CONNECT_OCTET command. The latency corresponds to the time required to finish the start-up process and become operational on the communication processor side.

Flow control can be enabled for both directions DL and UL and for each data channel separately. A project specific setting can for example enable flow control only for one of four data channels in UL and set no flow control for all DL channels. In the default configuration flow control may be enabled for all UL data channels. No flow control is present for DL data channels. The IPC sends out data in DL as soon as it receives a linked list of packets from the PS 309 via PBM 306.

According to one aspect of this disclosure, the flow control is based on credits. The receiver device has to send credits before the transmitter can send the first PDU (packet data unit). For example, credits are sent via the IPC via a CREDIT command to the application processor 302. Each credit allows the transmission of one PDU to the communication processor 301. When the transmitter device (communication processor 301 in downlink, application processor 302 in uplink) receives the CREDITS command it increases its value of credits by the newly received value. For each transmitted PDU it has to decrement its credit value by one. A transmitter (device) is not allowed to transmit when its credit value is 0.

With respect to power management both devices 301, 302 can initiate a wakeup by raising their WAKE line: ACWAKE resp. CAWAKE. A device 301, 302 can enter into sleep only once both ACWAKE and CAWAKE lines are low.

The devices can re-synchronize using a BREAK command as described below.

In the following, the data link protocol used for the MIPI HSI interface according to one aspect of this disclosure is described. This data link layer protocol is, according to one aspect of this disclosure, used for general-purpose data transfers over the MIPI HSI interface. This covers all data transfer types except audio data that requires a dedicated protocol to allow audio applications to meet tighter real-time requirements.

The data link layer protocol differentiates between control messages and data PDUs. The data link layer protocol reserves one of the logical channels to be used as a control channel. This channel is used to negotiate the channel configuration and the transmission of PDUs between the modem 301 and the application processor 302 (e.g. corresponding ASICs (application specific integrated circuits)). This is always the first channel of the interface, channel 0. The other logical channels of the interface are used as data channels. The transmission of data PDUs is based on fixed-length data PDUs. In data channels, the data is transmitted in one of two formats either raw format or packet format. In raw format the data link protocol does not require any special PDU structure. Using packet format the PDU is structured in a header and payload. The header provides information on the structure of the payload.

The data link layer protocol does not restrict their usage, but it provides a method to enable flow control between the transmitter and the receiver. With the flow control protocol the transmitter can be sure that the receiver is always ready to receive the data. Therefore the interface does not stall.

Since the data link layer protocol is a point-to-point protocol, there are always two devices involved and for example connected to the bus used for the data exchange. These devices, for example the modem 301 and the application processor 302, are in the following generally referred to A-device and B-device. In terms of the data link layer protocol, the only difference between the devices is that the A-device is the one who takes care about the configuration management. In the actual data transmission both devices are equal. For example, the application processor 302 (e.g. an application ASIC) is the A-device and the modem 301 (e.g. a modem ASIC) is the B-device.

The protocol of the control channel is a fixed sized PDU protocol. The PDU of the control channel is called command. The structure of a command is as follows:

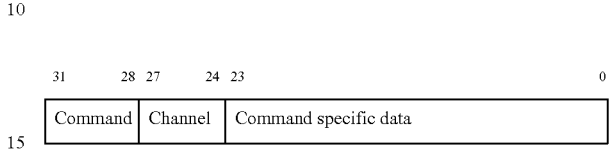

Examples for commands according to the data link layer protocol are given in table 2.

TABLE 2

List of data link layer protocol commands

| Value | Command | Response | Direction | Action |
|---|---|---|---|---|
| 0x0 | BREAK | | A -> B<br>B <- A | Cancel all connections and reset the configuration. |
| 0x1 | ECHO | | A -> B<br>B <- A | The receiver responds with ECHO command |
| 0x5 | CONF_CH | ACK/NAK | A→B | The channel specified in the channel field will be configured for the specified connection. |
| 0x7 | OPEN_CONN | ACK/NACK | A -> B<br>B <- A | The receiver opens a connection for reception of PDUs with specified length. |
| 0xA | CANCEL_CON | ACK/NACK | A -> B<br>B <- A | The open connection is cancelled and will be closed. The transmission will terminate. |
| 0xB | ACK | | A -> B<br>B <- A | The receiver has received and understood the command |
| 0xC | NACK | | A -> B<br>B <- A | The receiver has received, but not understood the command |
| 0xF | CREDITS | ACK/NACK | A -> B<br>B <- A | The sender updates the amount of credits. |

For example, the following commands are acknowledged with an ACK or a NAK command: CONF_CH, OPEN_CONN, CANCEL_CONN and CREDITS. The following commands are for example not acknowledged: BREAK, ECHO, ACK and NAK.

It should be noted that according to one aspect of this disclosure the commands are always transmitted using the control channel.

BREAK Command

The BREAK command is used to terminate all ongoing data transmissions on all the channels and reset the configuration to the initial state.

After the BREAK command is received, the receiver sends the BREAK command. The initiator has to keep sending BREAK (with 100 ms timeout) until it receives response BREAK command. After reception of the BREAK response communication can be re-started. For example, the timeout between initiator and receiver BREAK commands is 100 ms.

The BREAK command is for example always sent with the maximum number of channels using the channel 0 for transmission, the control channel. According to the command structure given above, the BREAK command has for example the following structure:

| 31 | 28 27 | 24 23 | 0 |
|---|---|---|---|
| Command | Channel | Reserved | |
| 0x0 | 0x0 | 0x000000 | |

ECHO Command

The ECHO command can be used to determine if the other device is present and alive. When a device receives the ECHO command, it responds with an ECHO command. The ECHO command has a constant check pattern field. It includes a pre-known constant (in this example 0xACAFFE), which is used to check the correctness of the channel configuration.

The channel is for example always the number of the control channel i.e. 0. According to the command structure given above, the ECHO command has for example the following structure:

| 31 | 28 27 | 24 23 | 0 |
|---|---|---|---|
| Command | Channel | Check pattern | |
| 0x1 | 0x0 | 0xACAFFE | |

CONF_CH command

The CONF_CH command is used to configure a logical channel for a specified connection. According to the command structure given above, it has for example the following structure:

| 31 | 28 27 | 24 23 | 16 15 | 8 7 | 0 |
|---|---|---|---|---|---|
| Command | Channel | The A-device of the channel | The B-device of the channel | Reserved | |
| 0x5 | | | | | |

The fields for the A-device of the channel and for the B-devices of the channel for example have the following structure:

| 15 | 8 7 | 0 |
|---|---|---|
| Flow Control | Data Format | |

The values for the flow control field are for example as given in table 3:

TABLE 3

Flow control field

| Value | Setting |
|---|---|
| 0x0 | No flow control |
| 0x1 | Flow control via credits |
| 0x2-0xF | Reserved for future use |

The values for data format field are for example as given in table 4:

TABLE 4

Data format field

| Value | Setting |
|---|---|
| 0x0 | Raw data |
| 0x1 | Packet data with byte alignment |
| 0x2 | Packet data with half-word alignment |
| 0x3 | Packet data with word alignment |
| 0x4 | Packet data with double-word alignment |
| 0x5 | Packet data with quad-word alignment |
| 0x6 | Packet data with 8-word alignment |
| 0x7 | Packet data with 16-word alignment |
| 0x8-0xF | Reserved for future use |

It should be noted that the CONF_CH command is applied at start-up before a channel is opened for connection. Reconfiguration for example requires closing the channel beforehand via CANCEL_CONN.

OPEN_CONN command

The OPEN_CONN command is used to open a connection for transmission of fixed-size PDUs. According to the command structure given above, it has for example the following structure:

| 31 | 28 27 | 24 23 | 8 7 | 0 |
|---|---|---|---|---|
| Command | Channel | Length of the PDU in 32-bit words. | Reserved | |
| 0x7 | | | | |

The OPEN_CONN command includes a 16-bit wide length field. The length field determines the number of 32-bit words in the PDU. The maximum length of a PDU is $2^{16}$ words, i.e. 256 Kbytes-1.

The receiver responses with ACK command, if it accepts the transmission. Otherwise it responses with NAK command (e.g. if there is a previous connection still open). The ACK command includes the length of the PDU. For example, the transmitter must not send the first PDU before the receiver has responded with ACK.

It should be noted that according to one aspect of this disclosure, in case the connection is configured to apply flow control, the transmitter must not send PDUs without having received sufficient credits.

CANCEL_CONN command

The CANCEL_CONN command is used to cancel the current connection that was requested by the OPEN_CONN command. According to the command structure given above, it has for example the following structure:

| 31 | 28 27 | 24 23 | 16 15 | 0 |
|---|---|---|---|---|
| Command | Channel | Direction | Reserved | |
| 0xA | | | 0x0000 | |

The values for the direction field are for example as given in table 5:

TABLE 5

Direction field values

| Value | Setting |
|---|---|
| 0x0 | Transmit |
| 0x1 | Receive |
| 0x2 | Transmit & Receive |
| 0x3-0xF | Reserved for future use |

The other device responds with ACK command if it agrees the cancellation. Otherwise it responses with a NAK command.

ACK Command

The ACK command is used by a device to signal that a preceding command sent by another device has been received, understood and that the receiver agrees to the command. The parameters of the preceding command are echoed back, hence the other device can check their correctness. According to the command structure given above, it has for example the following structure:

| 31 | 28 27 | 24 23 | 0 |
|---|---|---|---|
| Command 0xB | Channel | Echoed parameters | |

NAK Command

The NAK command is used by a device to signal that a preceding command sent by another device has been received but has not been understood and/or the device does not agree to the preceding command. According to the command structure given above, it has for example the following structure:

| 31 | 28 27 | 24 23 | 0 |
|---|---|---|---|
| Command 0xC | Channel | Reserved 0x000000 | |

CREDITS Command

The CREDITS command can be used to support flow control from the receiver to the transmitter. When a transmitting device receives the CREDITS command it increases its value of credits by the newly received value. For each transmitted PDU it decrements its credit value by one. A device is not allowed to transmit when its credit value is below 0.

| 31 | 28 27 | 24 23 | 16 15 | 0 |
|---|---|---|---|---|
| Command 0xA | Channel | Credits | Reserved 0x0000 | |

The transmission of data via the MIPI HSI interface according to the data link layer protocol is according to one aspect of this disclosure, based on fixed-size PDUs. The size of PDUs is for example a word (32 bit) aligned. The PDU size is signaled by the OPEN_CONN command. It is unchanged until the connection is closed via CANCEL_CONN command.

In raw format the data link protocol does not require any special PDU structure.

Figure 11:
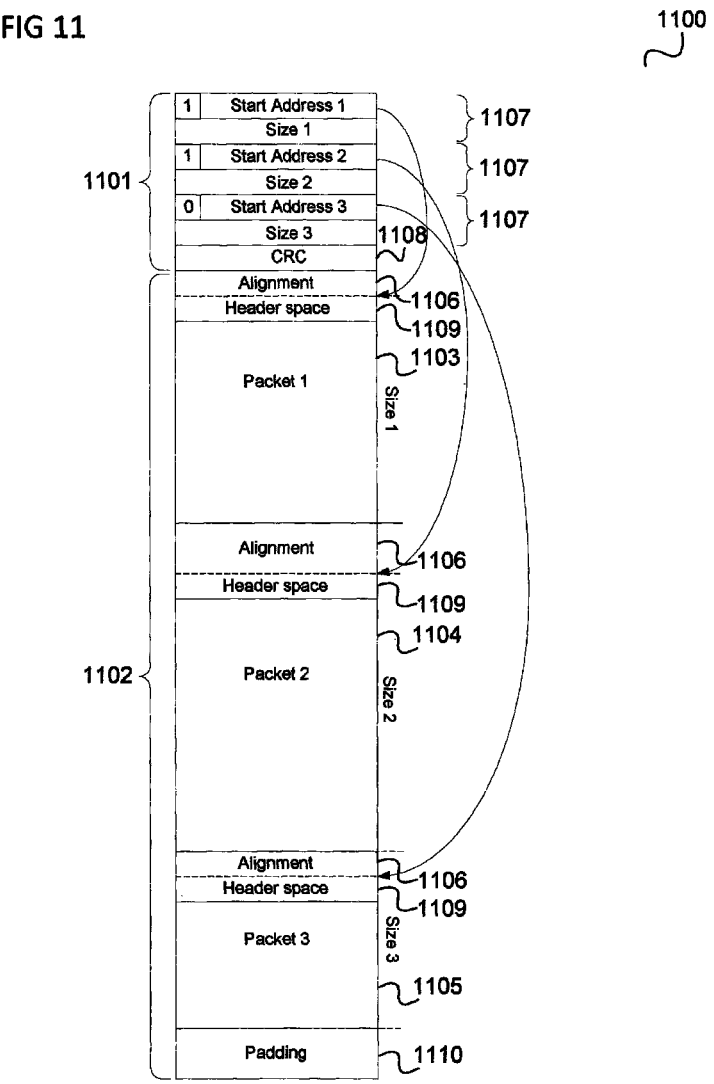
FIG. 11 shows a packet data unit.

The packet format is illustrated in FIG. 11.

FIG. 11 shows a data link layer packet data unit (PDU) 1100.

In packet format the PDU 1100 is structured in a header 1101 and a payload 1102:

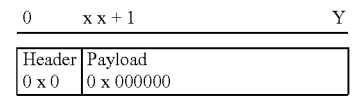

The header 1101 provides information on the structure of the payload 1102. The packet data inside of the payload 1102, in this example packets 1103, 1104, 1105, are aligned according to the configured alignment by means of alignments 1106.

The structure of the header is for example as follows:

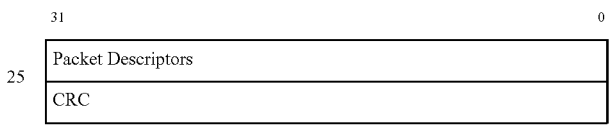

The header contains sequentially one packet descriptor 1107 for each packet 1103, 1104, 1105 of the payload 1102. Each packet descriptor 1107 provides the start address and size of a packet 1103, 1104, 1105 in the payload 1102. The start address and size are for example specified in Bytes. A special next (N) field may be used to signal whether a further packet descriptor is present (N=0b1) or the last packet descriptor has been reached (N=0b0). For example, a packet descriptor 1107 has the following structure:

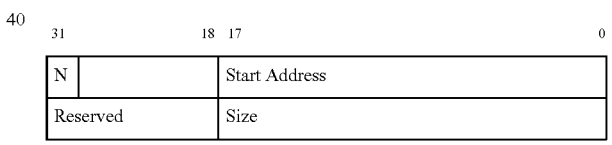

The packet descriptors 1107 are followed by a CRC check value 1108 of the header 1101.

The transmitter is responsible to assure that the packet data 1103, 1104, 1105 starts start according to the alignment as configured with the CONF_CH command. For half-word alignment the LSB of the packet start address must be 0b0, for word alignment the last two LSBs must be 0b00 and so on.

The payload 1102 includes packet data laid out as described in the PDU header.

The spacing of packet data is determined by two parameters: alignment and header space requirements of the receiver. The placing of the first byte of a packet obeys the alignment requirements (taken into account by alignments 1106). Free bytes 1109 in front of each packet 1103, 1104, 1105 are included to meet the header space requirement of the receiver.

It should be noted that the parameter header space requirement is pre-configured. It is determined at compile time and shared between the application processor 302 and the modem 301.

The PDU 1100 further includes a padding 1010 at its end.

As mentioned above, the PDU size is fixed and unchanged during a connection opened with the OPEN_CONN command. Generally, according to one aspect of this disclosure, a data link layer PDU size is determined which is kept constant as long as a logical channel is open (e.g., in the above example, constant for a connection over the logical channel). This is illustrated in FIG. 12.

Figure 12:
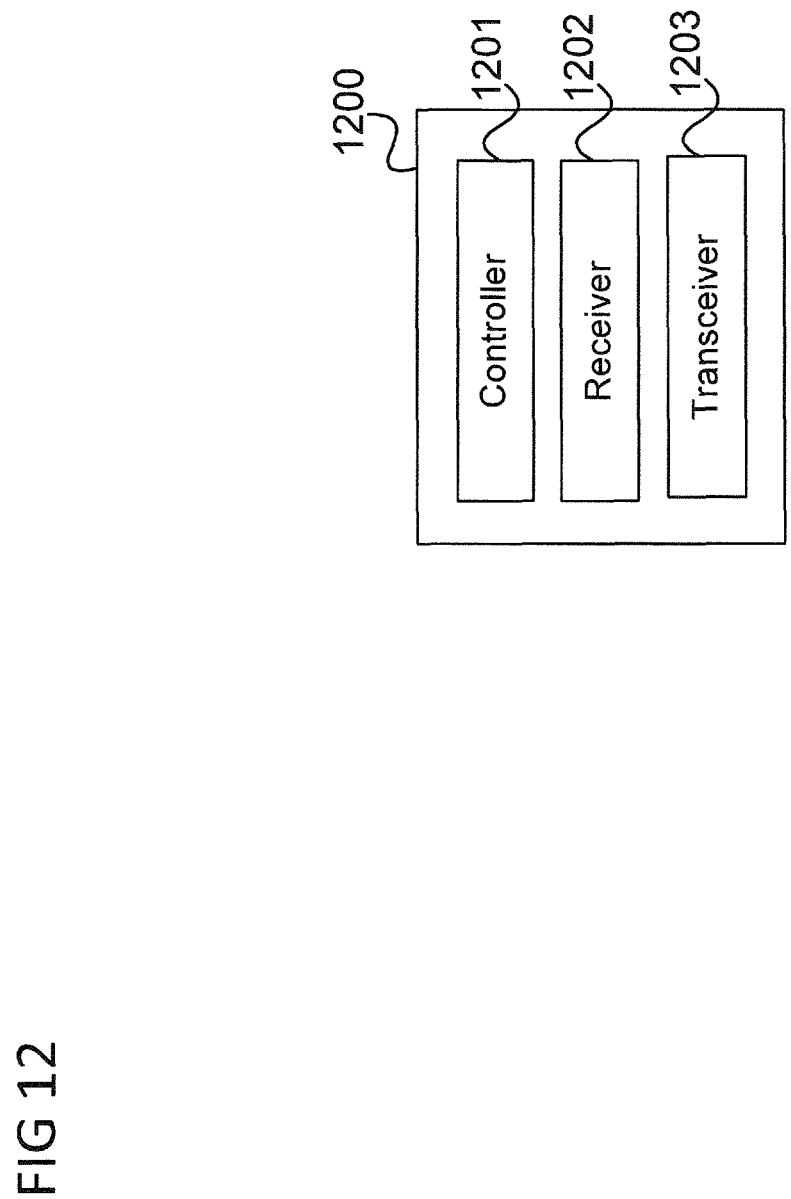
FIG. 12 shows a data processing device configured to receive an indication of a constant data link layer protocol data unit size from another data processing device.

FIG. 12 shows a data processing device 1200 indicating a constant data link layer protocol data unit size.

The data processing device 1200 includes a controller 1201 configured to open a logical channel with another data processing device and a receiver 1202 configured to receive a message from the other data processing device specifying a data link layer protocol data unit size to be used for exchanging data via the logical channel.

The data processing device 1200 further includes a transceiver 1203 configured to exchange data with the other data processing device over the logical channel in accordance with the data link layer protocol data unit size wherein the data link layer protocol data unit size is constant for the logical channel until the logical channel is closed.

According to one aspect of this disclosure, in other words, the size of a data link layer protocol data unit is determined when a logical channel is opened (e.g. a connection is opened for the logical channel) and is fixed until the logical channel is closed (e.g. is fixed for the duration of the connection). Opening a logical channel may be understood as bringing the logical channel in a state in which data can be transmitted over the logical channel (e.g. opening a connection by the OPEN_CONN command) and closing the logical channel may be understood as bringing the logical channel in a state in which data can no longer transmitted over the logical channel (until it is re-opened again).

For example, the each data link layer protocol data unit that is exchanged includes a plurality of network layer packets (e.g. IP packets) and one or more header fields describing the start points of the IP packets within the data link layer protocol data unit and the lengths of the IP packets. Further, for example, for the exchange of data link layer protocol data units flow control via credits may be used as described in more detail further below.

The controller may be configured to open the logical channel by establishing a connection with the other data processing device over the logical channel.

The controller may be configured to open the logical channel by transmitting a message to the other data processing device indicating that the data processing device requests that the logical channel should be opened.

For example, the data link layer protocol data unit size is specified in the message.

The data link layer protocol data unit size is for example specified in bytes or words.

The controller may for example be configured to transmit the message via another logical channel to the other data processing device.

The other logical channel is for example a control channel.

The controller is for example configured to close the logical channel by releasing the connection.

According to one aspect of this disclosure, the data processing device is a modem and the other data processing circuit is an application processor or the data processing device is an application circuit and the other data processing circuit is a modem.

For example, the data processing circuit and the other data processing circuit are components of the same communication device. The communication device is for example a cellular communication device.

Figure 13:
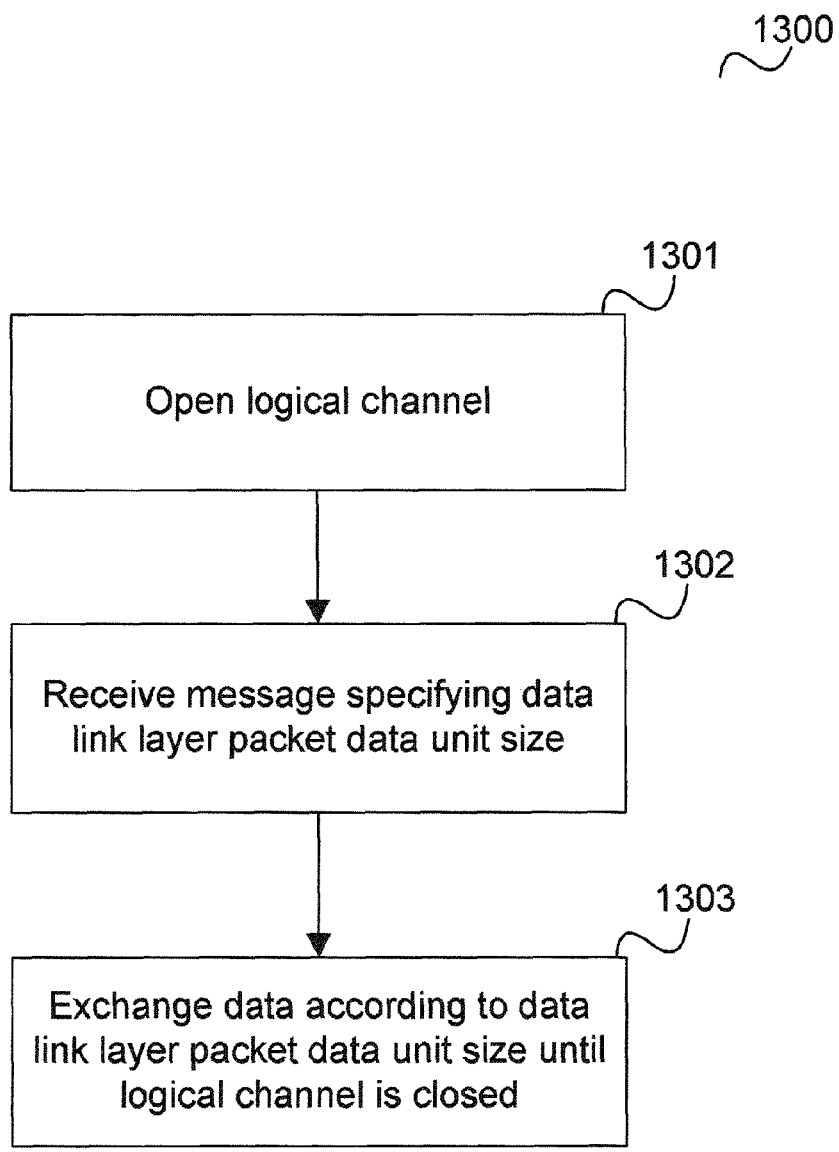
FIG. 13 shows a flow diagram for indicating a constant data link layer protocol data unit size.

The data processing device 1200 for example carries out a method as illustrated in FIG. 13.

FIG. 13 shows a flow diagram 1300 for indicating a constant data link layer protocol data unit size.

The flow diagram 1300 illustrates a method for communicating with a data processing device.

In 1301, a logical channel with a data processing device is opened.

In 1302, a message is received from the data processing device specifying a data link layer protocol data unit size to be used for exchanging data via the logical channel.

In 1302 data are exchanged with the data processing device over the logical channel in accordance with the data link layer protocol data unit size wherein the data link layer protocol data unit size is constant for the logical channel until the logical channel is closed.

Figure 14:
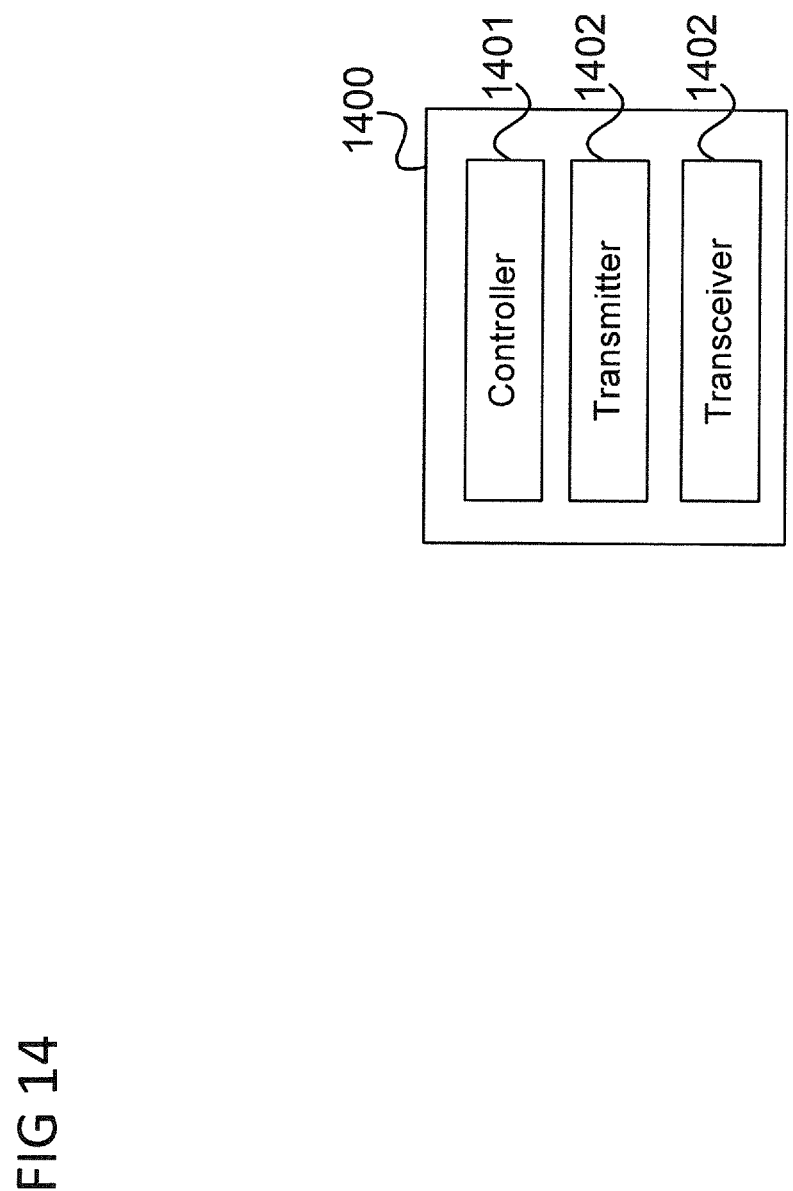
FIG. 14 shows a data processing device configured to indicate a constant data link layer protocol data unit size to another data processing device.

The data processing device 1200 for example communicates with a data processing device as illustrated in FIG. 14.

FIG. 14 shows a data processing device 1400 receiving an indication of a constant data link layer protocol data unit size.

The data processing device 1400 includes a controller 1401 configured to open a logical channel with another data processing device and a transmitter 1402 configured to send a message to the other data processing device specifying a data link layer protocol unit size to be used for exchanging data via the logical channel.

The data processing device 1400 further includes a transceiver 1403 (which may for example include the transmitter 1402) configured to exchange data with the other data processing device over the logical channel in accordance with the data link layer protocol data unit size wherein the data link layer protocol data unit size is constant until the logical channel is closed.

Figure 15:
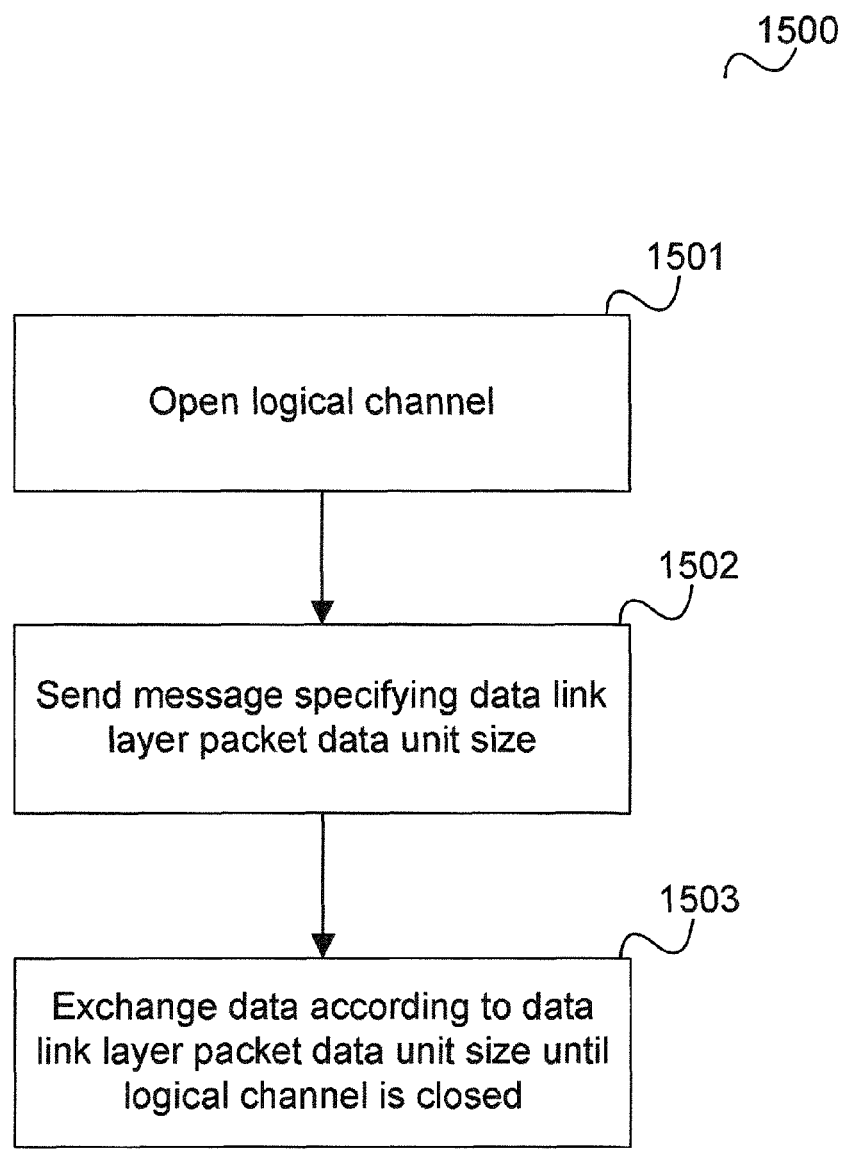
FIG. 15 shows a flow diagram for receiving an indication of a constant data link layer protocol data unit size.

The data processing device 1400 for example carries out a method as illustrated in FIG. 15.

FIG. 15 shows a flow diagram 1500 for receiving an indication of a constant data link layer protocol data unit size.

The flow diagram 1500 illustrates a method for communicating with a data processing device.

In 1501, a logical channel with a data processing device is opened.

In 1502, a message is sent to the data processing device specifying a data link layer protocol unit size to be used for exchanging data via the logical channel.

In 1503, data are exchanged with the data processing device over the logical channel in accordance with the data link layer protocol data unit size wherein the data link layer protocol data unit size is constant until the logical channel is closed.

As mentioned above, the transmitter includes free bytes 1109 (or in other words does not use parts of the message) preceding each data 1103, 1104, 1105 according to the header requirements of the receiver. Generally, according to one aspect of this disclosure, a data processing device includes in data link layer packet an unused part at a header position for a network layer data packet included in the data link layer packet. This is illustrated in FIG. 16.

Figure 16:
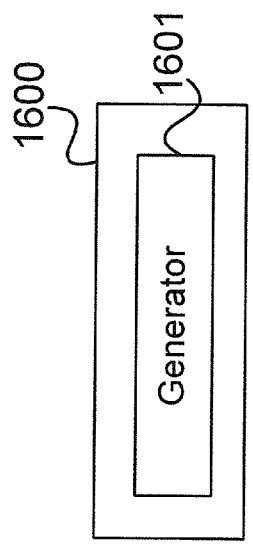
FIG. 16 shows a data processing device configured to insert a data link layer header space in a data link layer packet data unit.

FIG. 16 shows a data processing device 1600 inserting a data link layer header space in a data link layer packet data unit.

The data processing device 1600 includes a generator 1601 configured to generate a data link layer packet data unit based on a data link layer header size required by another data processing device for transmitting a network layer packet such that the data link layer packet data unit includes at least one network layer packet and an unused part which has at least the indicated data link layer header size and which is arranged within the data link layer packet data unit at a position of a data link layer header of the network layer packet.

In other words, according to an aspect of this disclosure, a data processing device leaves a room in a data link layer packet data unit before a network layer packet data unit that can be used by the receiver of the data link layer packet data unit to insert its own data link layer header information before the network layer packet data unit for transmitting (e.g. forwarding) the network layer packet data unit. This allows the receiver to simply fill in its own data link layer header information without copying the network layer packet data unit (and e.g. separating it from other network layex packet data units) for making room for data link layer header information for forwarding it. For example, the data link layer packet data unit may include a plurality of network layer packet data units and the receiver can strip away the header of the data link layer header, insert its own data link layer header for each of the network layer packets (which are for example individually provided with data link layer header information for, for example, transmitting them over different channels and/or to different receivers) into the free rooms provided before the network layer packet data units. The data link layer header size may be pre-stored in a memory of the data processing device such that the determiner may determine it by reading it out of the memory. The data link layer header size may also be included in a programming of the generator such that it is taken into account in the data link layer packet data unit generation.

The unused part may be used by further data link layer processing to include data link layer header information. For example, the network layer packets are transmitted from the data processing device to another data processing device via a first data link layer protocol and the other data processing device forwards the network layer packets in accordance with a first data link layer protocol. The other data processing device may then use the unused space to insert control data (i.e. header data) according to the second data link layer protocol. The data link layer may be understood as layer 2 and the network layer may be understood as layer 3 of the OSI model (Open Systems Interconnection Reference Model) of the ISO (International Organisation for Standardisation).

The data processing device may further include a determiner configured to determine the data link layer header size required by the other data processing device for transmitting a network layer packet.

The data processing device may further include a receiver configured to receive a message from the other data processing device indicating the data link layer header size required by the other data processing device for transmitting a network layer packet.

The at least one network layer packet is for example an IP packet.

The data link layer packet data unit for example includes a plurality of network layer packets and includes, for each network layer packet an unused part which has at least the indicated data link layer header size and which is arranged within the data link layer packet data unit at a position of a data link layer header of the network layer packet.

According to one aspect of this disclosure, the data processing device is a modem and the other data processing circuit is an application processor or the data processing device is an application circuit and the other data processing circuit is a modem.

The data processing circuit and the other data processing circuit may be components of the same communication device.

For example, the communication device is a cellular communication device.

Figure 17:
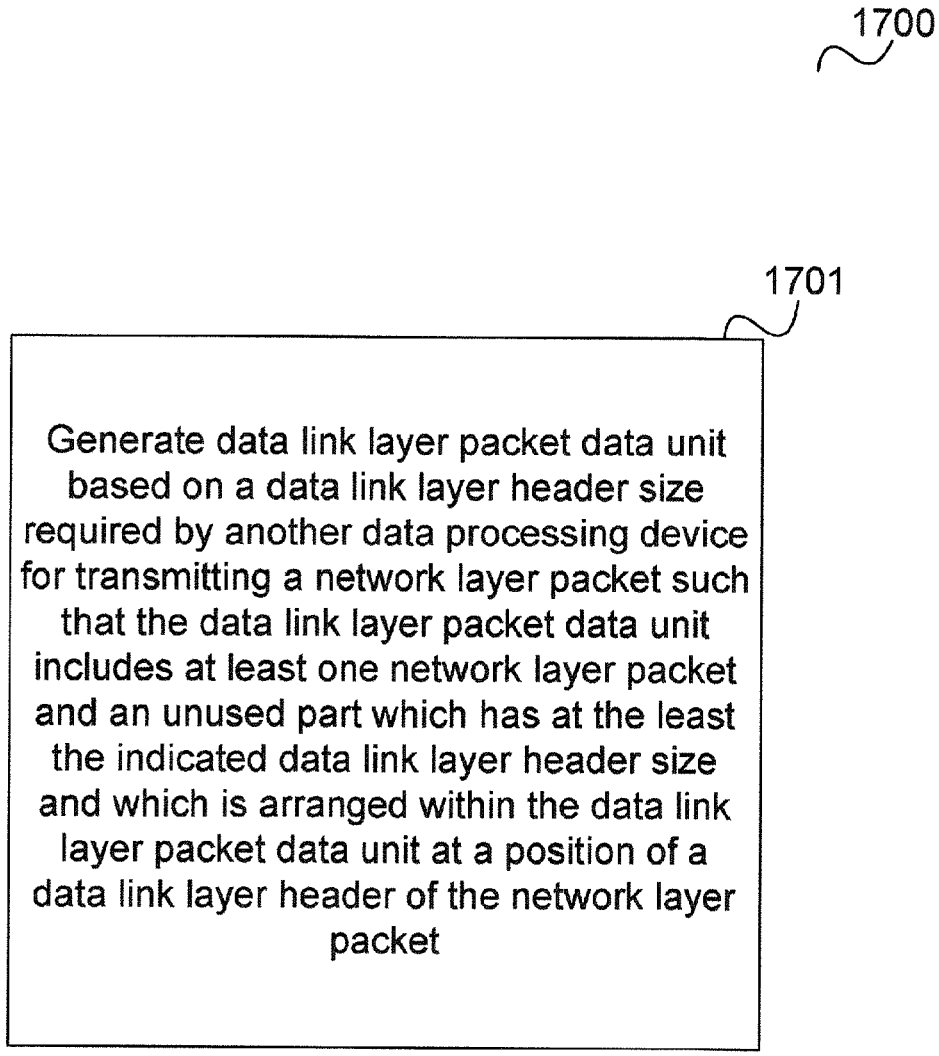
FIG. 17 shows a flow diagram for inserting a data link layer header space in a data link layer packet data unit.

The data processing device 1600 for example carries out a method as illustrated in FIG. 17.

FIG. 17 shows a flow diagram 1700 for inserting a data link layer header space in a data link layer packet data unit.

The flow diagram 1700 illustrates a method for transferring network layer data.

In 1701, a data link layer packet data unit is generated based on a data link layer header size required by a data processing device for transmitting a network layer packet such that the data link layer packet data unit includes at least one network layer packet and an unused part which has at least the indicated data link layer header size and which is arranged within the data link layer packet data unit at a position of a data link layer header of the network layer packet.

Figure 18:
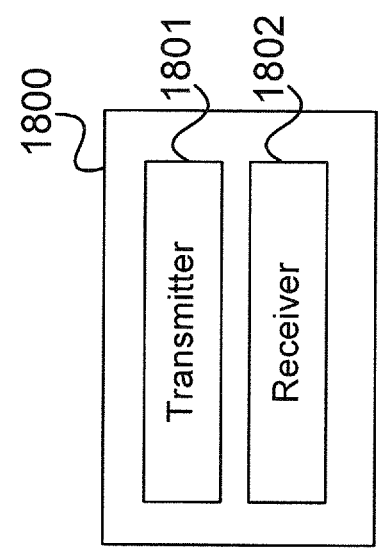
FIG. 18 shows a data processing device receiving a data link layer packet data unit with an inserted data link layer header space.

The data processing device 1600 for example communicates with a data processing device as illustrated in FIG. 18.

FIG. 18 shows a data processing device 1800 receiving a data link layer packet data unit with an inserted data link layer header space.

The data processing device 1800 includes a transmitter 1801 configured to transmit a message to another data processing device indicating a data link layer header size required by the data processing device for transmitting a network layer packet.

The data processing device 1800 further includes a receiver 1802 configured to receive a data link layer packet data unit from the other processing device including at least one network layer packet and an unused message part which has at least the indicated data link layer header size and which is arranged within the data link layer packet unit at a position of a data link layer header of the network layer packet.

Figure 19:
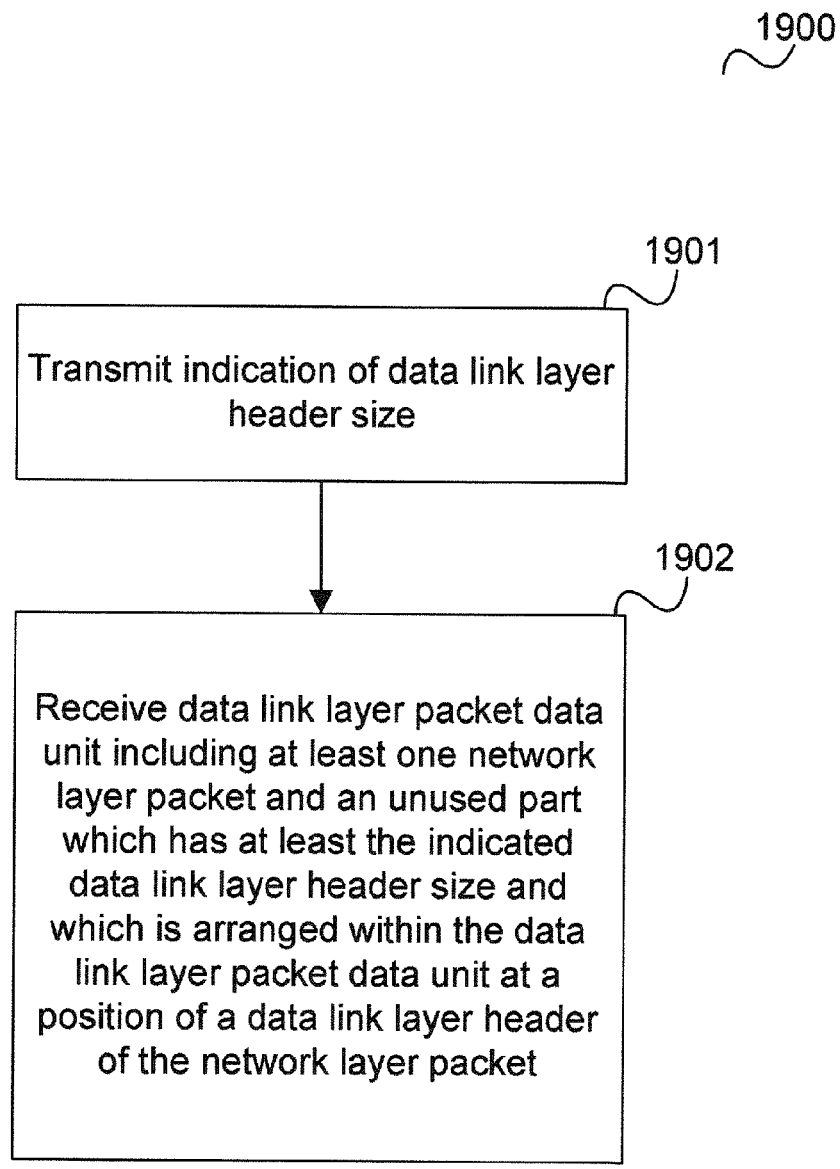
FIG. 19 shows a flow diagram for receiving a data link layer packet data unit with an inserted data link layer header space.

The data processing device 1800 for example carries out a method as illustrated in FIG. 19.

FIG. 19 shows a flow diagram 1900 for receiving a data link layer packet data unit with an inserted data link layer header space.

The flow diagram 1900 illustrates a method for receiving network layer data.

In 1901, a message is transmitted to a data processing device indicating a data link layer header size required by the data processing device for transmitting a network layer packet.

In 1902, a data link layer packet data unit is received from the processing device including at least one network layer packet and an unused message part which has at least the indicated data link layer header size and which is arranged within the data link layer packet unit at a position of a data link layer header of the network layer packet.

Using the data link layer protocol (DLP) commands as described above, the parameters of the MIPI HSI interface as shown in table 6 may for example be configured.

TABLE 6

| Parameter | Default Value | Setting | Range |
| --- | --- | --- | --- |
| Flow Control | 0x0 | No flow control | 0x0, 0x1 |
| Data Format | 0x0 | Raw format | 0x0-0x7 |
| PDU length | 0x3C00 | 15 KB | 4 B-256 kB |

The parameter shown in table 7 are for example pre-configured using a default value (default setting). For example, the parameter values are determined at compile time and are shared between the modem 301 and the application processor 302.

TABLE 7

| Parameter | Default Setting | Range |
|---|---|---|
| AP/CP Wake signal | included | |
| RX Data Flow | pipelined | synchronized, pipelined |
| Bit Transmission mode | Frame | |
| Channel descriptor | 3 bit (8 channels) | 3 bit, 4 bit |
| CP transmission speed | 208 Mbit/s | 1, 5, 52, 104, 208 Mbit/s |
| AP transmission speed | 100 Mbit/s | 1, 5, 50, 100, 200 Mbit/s |
| CP header space | 4 B | 0-64 B |
| AP header space | 18 B | 0-64 B |

In the following, an example is given how communication is (initially) established between the data link layer device drivers of the A-Device and the B-Device with reference to FIG. 20.

Figure 20:
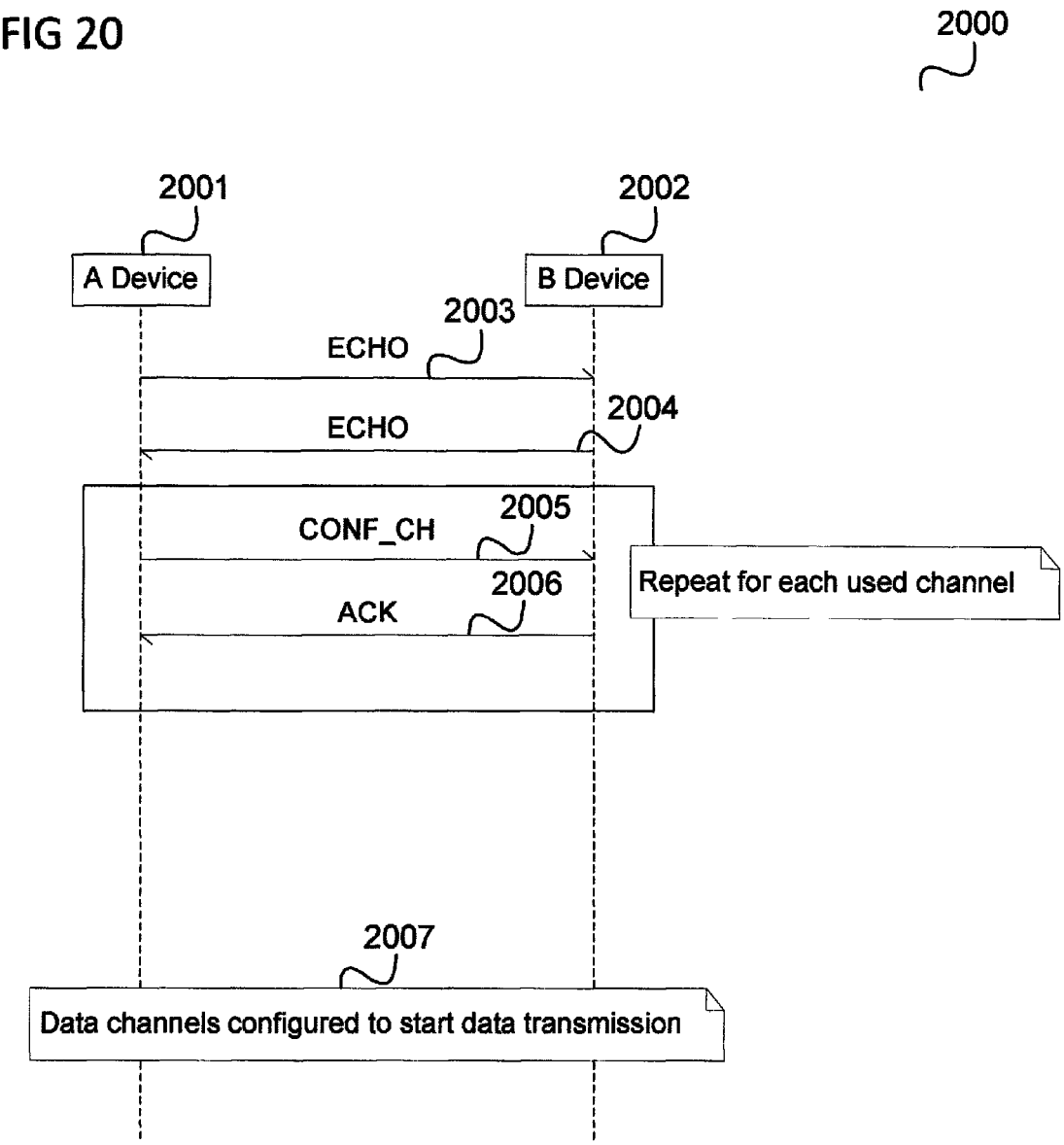
FIG. 20 shows a message flow diagram for a communication startup configuration.

FIG. 20 shows a message flow diagram 2000 for a communication startup configuration.

The message flow takes place between an A-Device 2001 and a B-Device 2002.

In 2003, the A-Device uses an ECHO command to probe if the B-Device is alive.

In 2004, the B-Device responds with an ECHO command.

In 2005, the A-Device uses a CONF_CH command to configure a channel.

In 2006, B-Device responds with ACK to accept the channel configuration. 2005 and 2006 are carried out for each channel to be used.

In 2007, the A-Device and the B-Device configure their HSI drivers and prepare the configured channels for data transmission.

In the following, an example of a transmission of a data link layer PDU in channel 2 is given with reference to FIG. 21.

Figure 21:
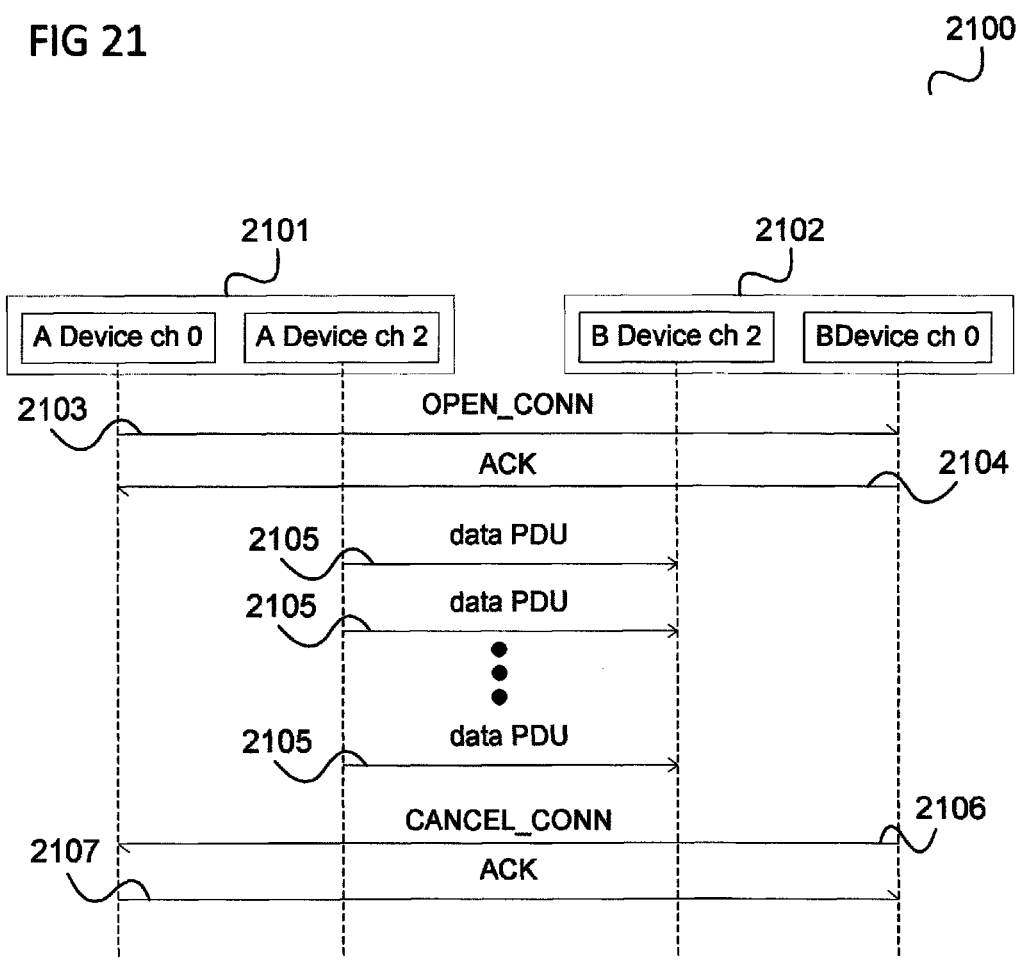
FIG. 21 shows a message flow diagram for a data link layer PDU transmission.

FIG. 21 shows a message flow diagram 2100 for a data link layer PDU transmission.

The message flow takes place between an A-Device 2101 and a B-Device 2102.

In 2103, one of the devices (in this example, A-Device 2101) sends an OPEN_CONN command to indicate it wants to send data PDUs of fixed size in a specified channel (channel 2 in this example).

In 2104, the other device (in this example, B-Device 2102) acknowledges the command with ACK. This means that the transmission may start.

In 2105, the A-Device sends fixed size PDUs over channel 2.

In 2106, when A-Device 2101 or B-Device 2102 wants to close the channel (in this example B-Device 2102) it sends a CANCEL_CONN command which is acknowledged in 2107 by an ACK command.

In the following, an example for a transmission of data PDUs with flow control in channel 2 is given with reference to FIG. 22.

Figure 22:
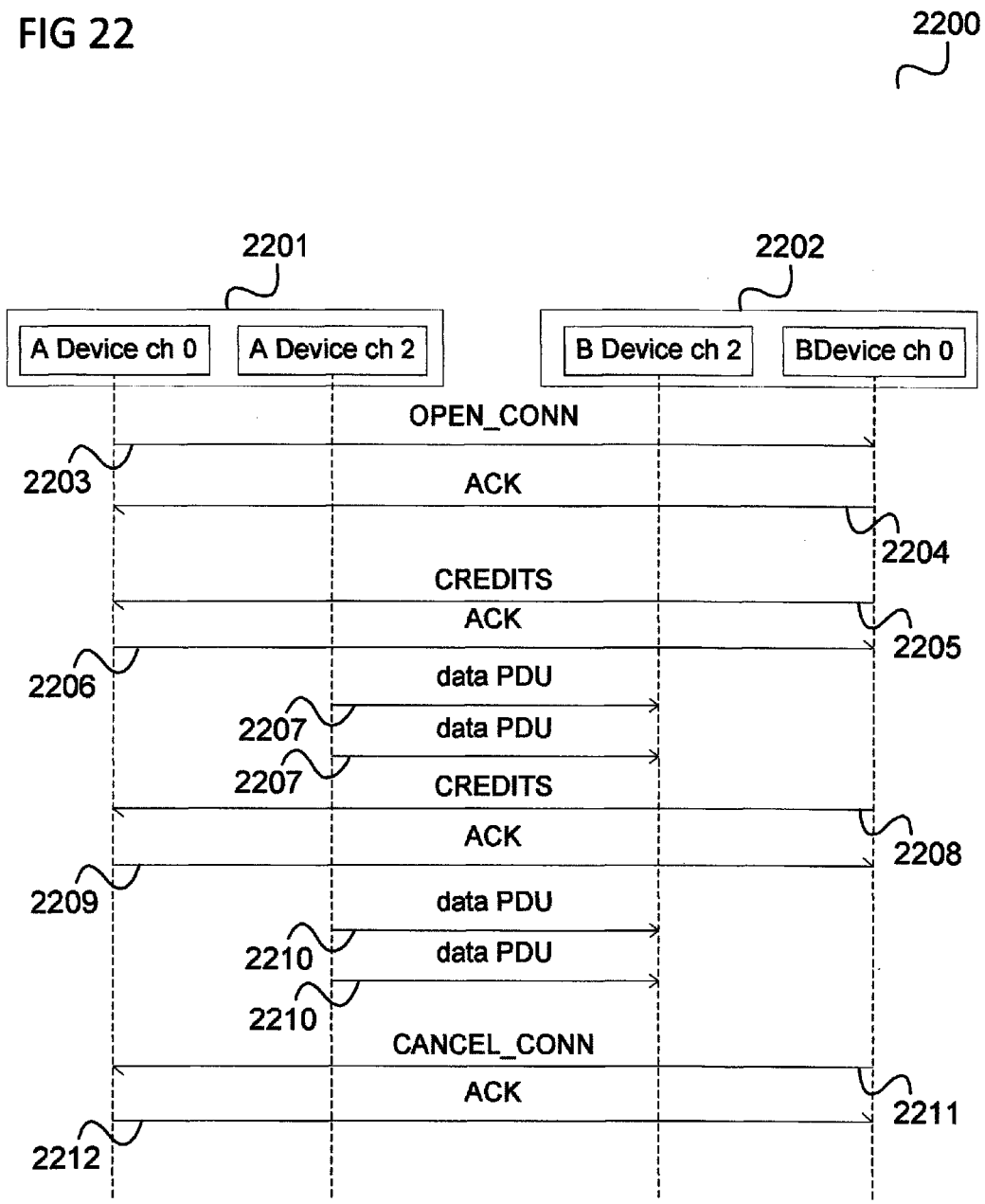
FIG. 22 shows a message flow diagram a data link layer PDU transmission with flow control.

FIG. 22 shows a message flow diagram 2200 a data link layer PDU transmission with flow control.

The message flow takes place between an A-Device 2201 and a B-Device 2202.

In 2203, one of the devices (in this example, the A-Device 2201) sends an OPEN_CONN command to indicate it wants to send data PDUs of fixed size in a specified channel (channel 2).

In 2204, the other device (in this example, the B-Device 2202) acknowledges the command with an ACK command.

In 2205, the receiver device (B-Device 2202) sends credits to allow the transmitter to start to send the first PDU which is acknowledged by A-Device in 2206.

In 2207, the fixed size PDUs are transmitted. For each transmitted PDU the transmitter has to decrement its credit value by one. A transmitter is not allowed to transmit when its credit value is below 0.

When, in 2208 the transmitter device receives the CREDITS command (acknowledged in 2209) it increases its value of credits by the newly received value and can continue sending PDUs in 2210.

In 2211, when A-Device 2101 or B-Device 2102 wants to close the channel (in this example B-Device 2102) it sends a CANCEL_CONN command which is acknowledged in 2112 by an ACK command.

In the following, an example for a re-configuration of the PDU size is given with reference to FIG. 23. According to one aspect of this disclosure, each channel uses fixed size PDUs for data transmission in each direction. Changing the length requires to close an open connection and to re-open it with a different length parameter. In this example data PDUs are transmitted in channel 2 with a change of PDU length.

Figure 23:
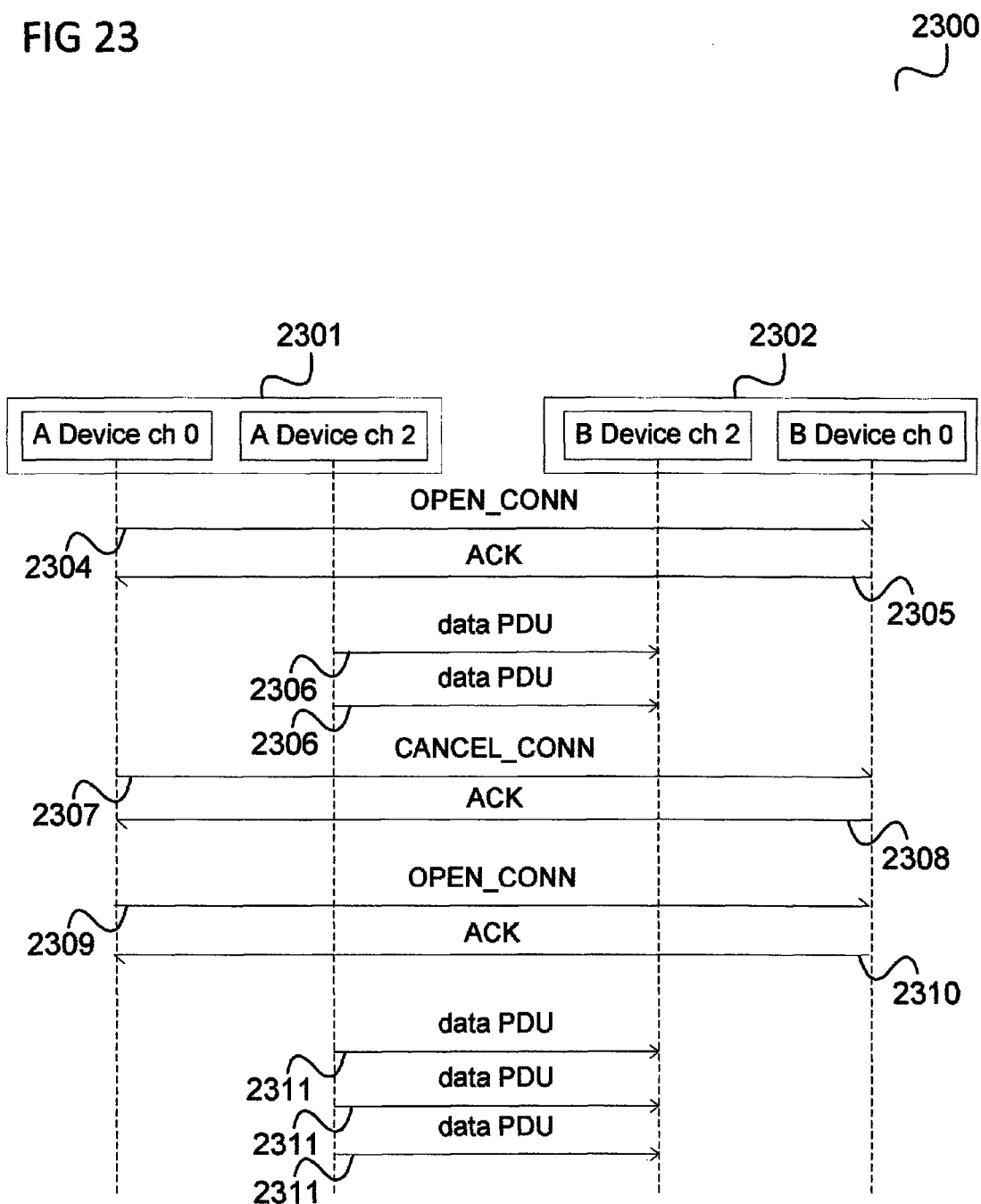
FIG. 23 shows a message flow diagram for a re-configuration of a PDU size.

FIG. 23 shows a message flow diagram 2300 for a re-configuration of a PDU size.

The message flow takes place between an A-Device 2301 and a B-Device 2302.

In 2304, one of the devices (in this example, the A-Device 2301) sends an OPEN_CONN command to indicate it wants to send data PDUs of fixed size in a specified channel (channel 2 in this example).

In 2305, the other device (in this example, the B-Device 2302) acknowledges the command with ACK. This means that the transmission may start.

In 2306, the A-Device 2301 sends fixed size PDUs.

In 2307, when the A-Device 2301 wants to close the channel it sends a CANCEL_CONN command which is acknowledged in 2308.

In 2309, the A-device 2301 re-opens the channel by sending an OPEN_CONN command with a different length setting.

In 2310, the B-Device 2302 acknowledges the OPEN_CONN command with an ACK command. This means that the transmission may start again.

In 2311 the A-Device 2301 sends fixed size PDUs with the new length.

It should be noted that the receiver may inform the transmitter that the PDU size should be changed.

In the following, an example for a re-synchronization message exchange is described with reference to FIG. 24.

Figure 24:
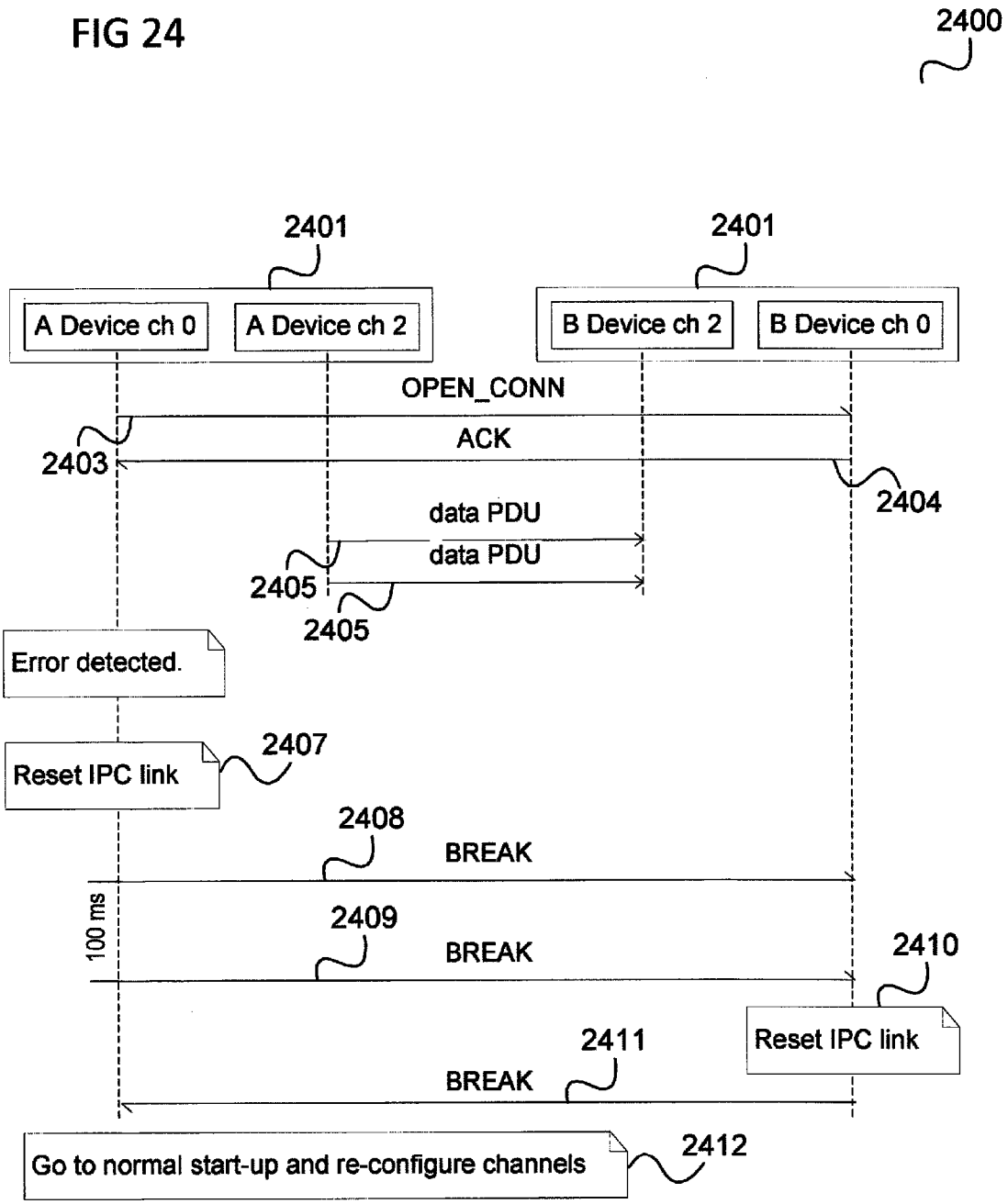
FIG. 24 shows a message flow diagram for a re-synchronization.

FIG. 24 shows a message flow diagram 2400 for a re-synchronization.

The message flow takes place between an A-Device 2401 and a B-Device 2402.

In 2403, one of the devices (in this example, the A-Device 2401) sends an OPEN_CONN command to indicate it wants to send data PDUs of fixed size in a specified channel (channel 2 in this example).

In 2404, the other device (in this example, the B-Device 2402) acknowledges the command with ACK. This means that the transmission may start.

In 2405, the A-Device 2301 sends fixed size PDUs.

In 2406, one of the devices, A-Device 2401 in this example, detects a time-out error or another critical system error.

In 2407, A-Device 2401 resets the configuration of the IPC link.

In 2408, the A-device 2401 (the device which has detected the error state), sends a BREAK command.

In 2409, the A-device 2401 repeats the sending of the BREAK with a time-out interval of for example 100 ms.

Upon reception of the BREAK command the B-device 2402 resets its configuration of the IPC link in 2410 and responds with a BREAK command in 2411.

In 2412, the devices 2401, 2402 proceed with the normal start-up and reconfigure the channels.

According to one aspect of this disclosure, the modem 301 and the application processor 302 support scatter/gather processing. This is described in the following.

Figure 25:
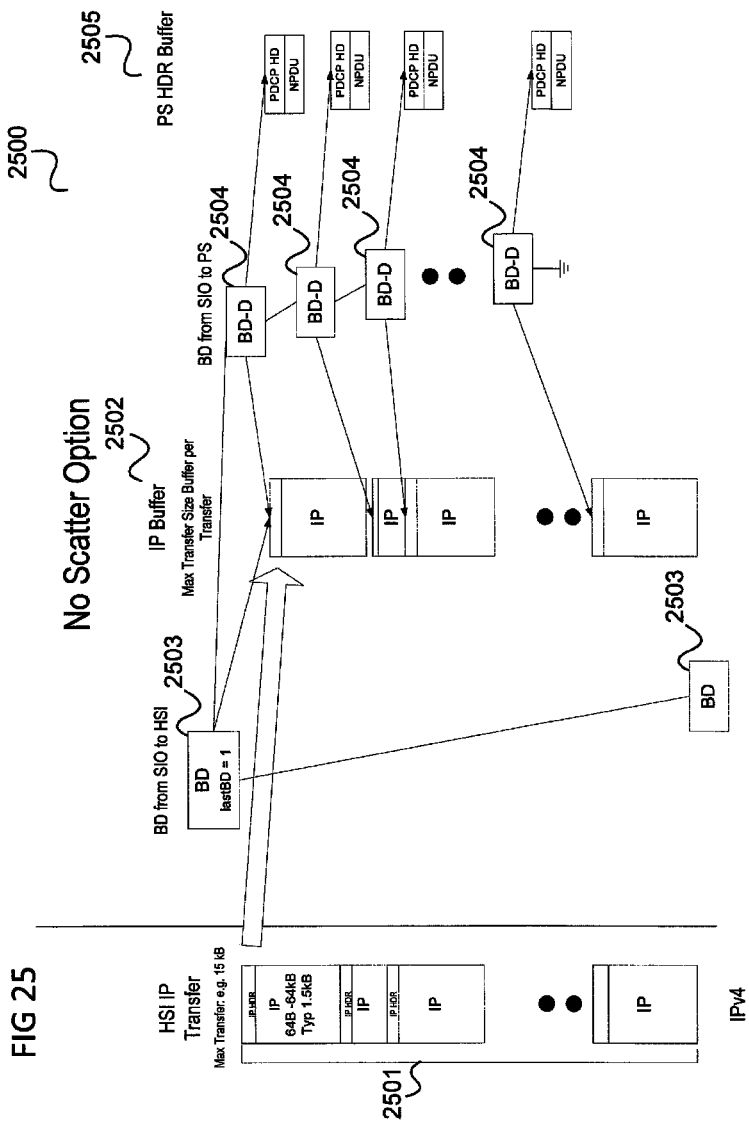
FIG. 25 shows a data flow diagram without scatter operation.

FIG. 25 shows a data flow diagram 2500 without scatter operation.

A plurality of IP packets 2501 are received by the modem (for uplink transmit direction), e.g. by means of a data link layer PDU as described above with reference to FIG. 11 and are as a whole stored in an IP packet buffer 2502. For example, there is one IP buffer 2502 per channel. The location of the IP packets 2501 within the IP packet buffer 2502 is specified by first buffer descriptors 2503 signaled from SIO 308 to the HSI interface. The location of the individual IP packets 2501 is signaled from the SIO 308 to the PS 307 by means of second buffer descriptors 2504, which may, according to one aspect of this disclosure, refer to PDCP header information in a PS Header buffer 2505.

It should be noted that the hardware may not be aware of frame boundaries. This is addressed by fixed size transfers, where the transfer size can be dynamically configured between modem 301 and the application processor 302 based on control data from the protocol stack.

Figure 26:
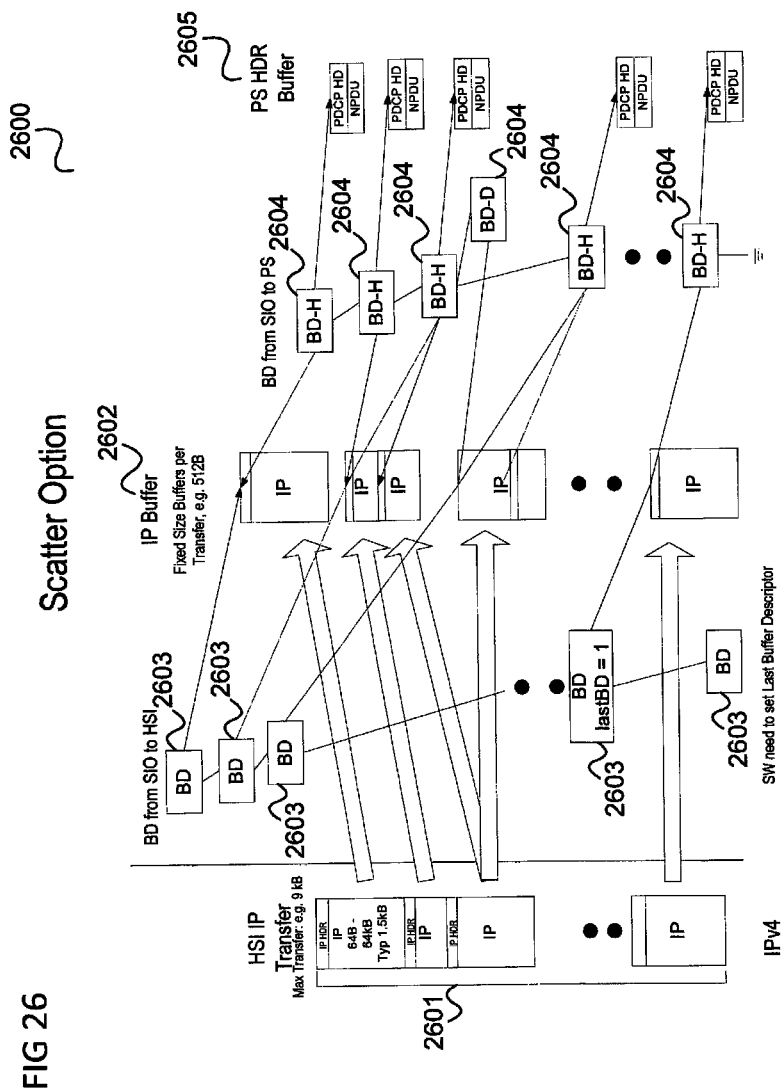
FIG. 26 shows a data flow diagram with scatter operation.

A scatter operation may be used for reducing the memory usage for small package uplink transmission as illustrated in FIG. 26.

FIG. 26 shows a data flow diagram 2600 with scatter operation.

Similarly to the data flow shown in FIG. 25, a plurality of IP packets 2601 are received by the modem (for uplink transmit direction), e.g. by means of a data link layer PDU as described above with reference to FIG. 11. With scatter operation, the IP packets are individually stored in individual IP packet buffers 2602, e.g. in an external memory. The location for storing the IP packets 2601 is specified by first buffer descriptors 2603 signaled from SIO 308 to the HSI interface and is signaled from the SIO 308 to the PS 307 by means of second buffer descriptors 2604, which may, according to one aspect of this disclosure, refer to PDCP header information in a PS Header buffer 2605.

With the scatter option IP frames are split over several buffers. On the other side IP frames may be stored in external memory, where space constraints are relaxed.

For DL (downlink) direction the IPC interface gathers IP packets from various IP buffer locations to assemble large IPC transfers. This is illustrated in FIG. 27.

Figure 27:
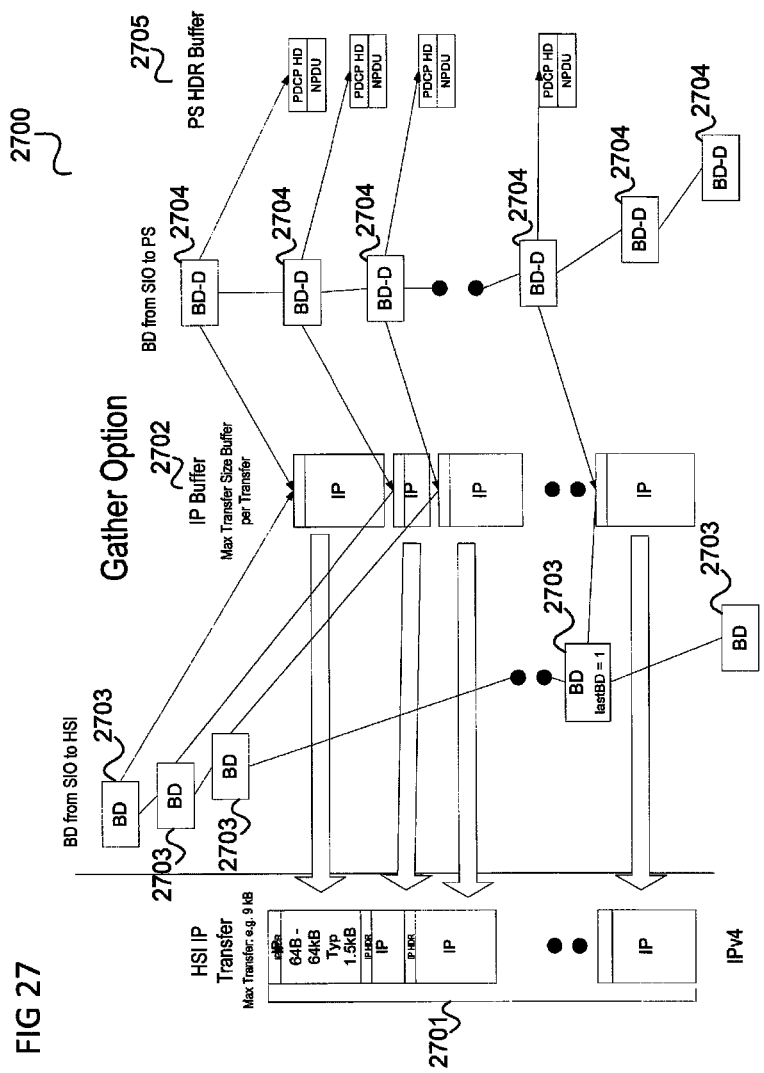
FIG. 27 shows a data flow diagram with gather operation.

FIG. 27 shows a data flow diagram 2700 with gather operation.

IP packets stored in individual IP packet buffers 2702, e.g. in an external memory, are assembled to a block of IP packets 2701 that is sent over the interface.

The location of the IP packets (e.g. in the external memory) is specified by first buffer descriptors 2703 signaled from SIO 308 to the HSI interface and is signaled from the SIO 308 to the PS 307 by means of second buffer descriptors 2704, which may, according to one aspect of this disclosure, refer to PDCP header information in a PS Header buffer 2705.

In the processing of the stored IP packets, a linked list of buffer descriptors which are pointing to the corresponding data buffers (e.g. IP packet buffers 2502, 2602, 2702) is followed by the processing hardware, e.g. IPC hardware 305. The hardware stops traversing the list when it finds a next pointer with zero or last flag set by the software at a particular buffer descriptor.

The hardware issues an interrupt when it has processed a buffer descriptor, where the software has set a tail IRQ flag.

For each buffer descriptor the hardware fills (for UL transmission) or empties (for DL transmission) the corresponding data buffer with data transmitted over the IPC link to the application processor 302.

According to one aspect of this disclosure DMA (Direct Memory Access) is used in the processing of the IP packets. Each logical DMA channel has its own linked list of buffer descriptors that is prepared by SW and consumed by HW.

For Uplink, each DMA channel has the starting address of the first UL buffer descriptor of the linked list programmed in a nextBufferDesciptor register in the HSI hardware. For example, there are 16 Next Buffer Descriptor registers corresponding to the 16 logical channels.

An uplink buffer descriptor for example includes the information is indicated in table 8.

TABLE 8

| Name | Size | Description | HW | SW |
|---|---|---|---|---|
|  | 28 | Points to next buffer descriptor item of linked list<br>Aligned on 4 word boundary | r | rw |
| dataStartPointer | 30 | Points to start of UL data range in buffer<br>Word aligned address | r | w |
| dataSize | 20 | Length of data range in buffer<br>Word aligned | r | w |
| tailIrqEn | 1 | Triggers end of transfer interrupt after processing of the buffer descriptor, when this bit has been set | r | w |
| lastBD | 1 | Indicates last buffer descriptor to be processed by HW<br>HW stops traversing linked list until being re-enabled by SW | r | w |
| prevBufferDescriptor | 28 | Points to previous buffer descriptor item of linked list<br>Aligned on 4 word boundary | r | rw |
| doneSW | 1 | Set by SW when buffer descriptor is processed | — | rw |
| dataBufferPonter | 32 | Points to start of buffer in memory, used by SW to reclaim buffer | — | rw |

TABLE 8-continued

UL buffer descriptor

| Name | Size | Description | HW | SW |
|---|---|---|---|---|
| dataBufferLength | 16 | Length of buffer in memory, used by SW to reclaim buffer | — | rw |

In downlink each DMA channel has the starting address of the first DL buffer descriptor of the linked list programmed in a nextBufferDesciptor register in the HSI hardware. There are 16 Linked Next Buffer Descriptor registers corresponding to the 16 logical channels. A downlink buffer descriptor for example includes the information is indicated in table 9.

TABLE 9

UL buffer descriptor

| Name | Size | Description | HW | SW |
|---|---|---|---|---|
| nextBufferDescriptor | 28 | Points to next buffer descriptor item of linked list<br>Aligned on 4 word boundary | r | rw |
| dataStartPointer | 30 | Points to start of UL data range in buffer<br>Word aligned address | r | w |
| dataSize | 20 | Size of UL data range in buffer<br>Word aligned | r | w |
| tailIrqEn | 1 | Triggers interrupt after processing of the buffer descriptor, when this bit has been set | r | w |
| lastBD | 1 | Indicates last buffer descriptor to be processed by HW<br>HW stops traversing linked list until being re-enabled by SW | r | w |
| prevBufferDescriptor | 28 | Points to previous buffer descriptor item of linked list<br>Aligned on 4 word boundary | r | rw |
| doneSW | 1 | Set by SW when buffer descriptor is processed | — | rw |
| dataBufferPonter | 32 | Points to start of buffer in memory, used by SW to reclaim buffer | — | rw |
| dataBufferLength | 16 | Length of buffer in memory, used by SW to reclaim buffer | — | rw |

As can be seen from tables 8 and 9, the software can set by means of the tailIrq flag whether an interrupt should be issued by the hardware after processing of a buffer descriptor, i.e. of the corresponding IP packet.

Generally, a data processing device may have stored an indication specifying whether an interrupt should be issued after processing a network layer data block. This is illustrated in FIG. 28.

Figure 28:
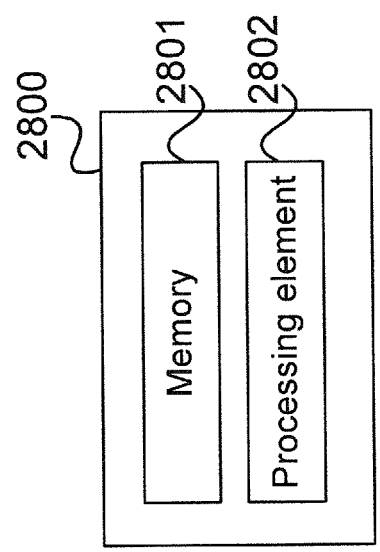
FIG. 28 shows a data processing device processing a network layer data block.

FIG. 28 shows a data processing device 2800 processing a network layer data block.

The data processing device 2800 includes a memory 2801 storing, for each network layer data block of a plurality of network layer data blocks, an indication whether an interrupt should be issued after the processing of the network layer data block.

The data processing device 2800 further includes a processing element 2802 configured to process each network layer data block and to issue an interrupt after processing of the network layer block if the indication stored for the network layer data block indicates that an interrupt should be issued after the processing of the network layer data block.

According to one aspect of this disclosure, in other words, there is a setting for each of a plurality of network layer data blocks whether there should be an interrupt after the processing of the network layer data block. The setting may be stored as an indication (e.g. a flag) by means of a buffer descriptor of the network layer data block that may have further information regarding the processing of the network layer data block and may be associated with the buffer (e.g. the area of the first memory) in which the network layer data block is stored or is to be stored.

The data processing may further include a determiner configured to determine, for each network layer data block, whether the indication stored for the for the network layer data block indicates that an interrupt should be issued after the processing of the network layer data block.

The processor is for example configured to issue an interrupt after processing of the network layer block only if the indication stored for the network layer data block indicates that an interrupt should be issued after the processing of the network layer data block.

The interrupt is for example an interrupt for triggering the transmission of a control message.

The indication is for example stored by software.

The network layer data blocks may for example be IP data blocks and the network layer packets are IP packets.

For example, the data processing device is a modem of a communication device.

According to one aspect of this disclosure, the network layer data packets are data packets received via wireless communication and to be transmitted to an application processor of the communication device or data packets received from the application processor to be transmitted via wireless communication.

Figure 29:
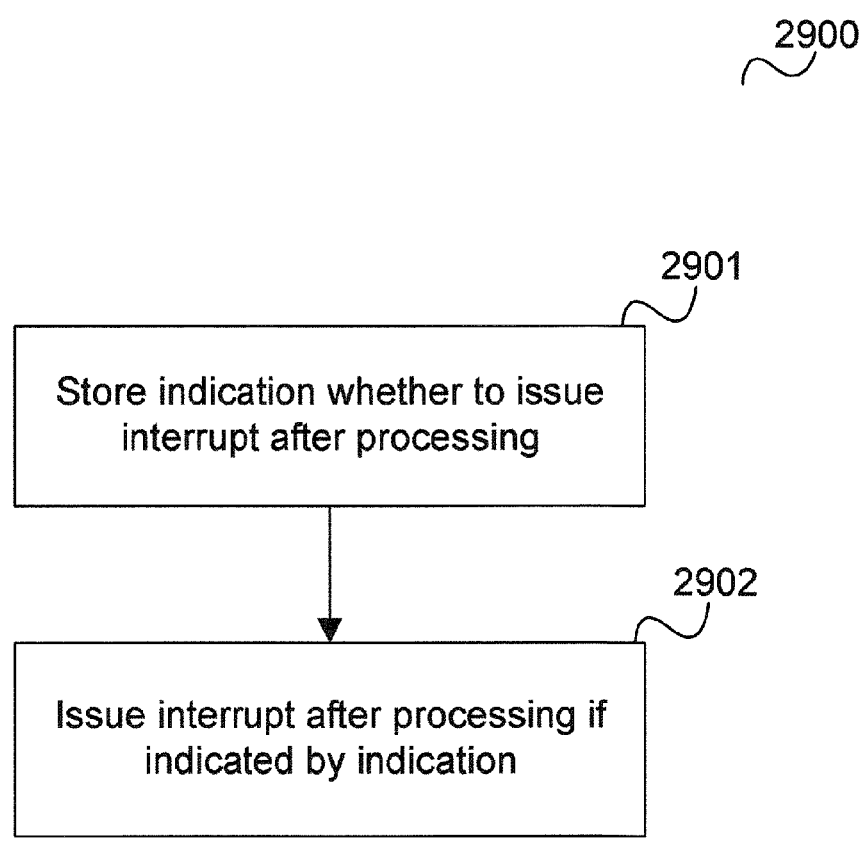
FIG. 29 shows a flow diagram for processing network layer data.

The data processing device 2800 for example carries out a method as illustrated in FIG. 29.

FIG. 29 shows a flow diagram 2900 for processing network layer data.

The flow diagram 2900 illustrates a method for processing network layer data.

In 2901, for each network layer data block of a plurality of network layer data blocks, an indication is stored whether an interrupt should be issued after the processing of the network layer data block.

In 2902, each network layer data block is processed and an interrupt is issued after processing of the network layer block if the indication stored for the network layer data block indicates that an interrupt should be issued after the processing of the network layer data block.

The various components of the communication devices (e.g. detector, controller and determiner) may be implemented by means of one or more circuits. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should further be noted that embodiments described in context of any one of the data processing devices are analogously valid for the other data processing devices and the methods.

In the following, message flows for uplink and downlink transmissions are shown for various options regarding synchronization between. HSI software and HSI hardware.

FIG. 30 shows a message flow diagram 3000 for synchronization by previous buffer pointer.

The message flow takes place between a protocol stack 3001 (e.g. corresponding to protocol stack 307, a buffer management entity 3002 (e.g. implemented as part of the operating system of the communication device 300), a S-IO 3003 (e.g. corresponding to S-IO 308), a HSI driver 3004 (e.g. corresponding to IPC protocol driver 303 and IPC physical driver 304) and HSI hardware 3005 (e.g. corresponding to HSI hardware 305).

The message flow corresponds to the case of synchronizing by previous buffer pointer.

In 3006, the HSI driver 3004 requests the buffer descriptor linked list for each channel from the buffer management entity 3002 which 3002 allocates data buffers (i.e. IP packet buffers) provides a linked list for the IP buffer descriptors in 3007 to the HSI driver 3004. 3006 and 3007 are for example carried out via the S-IO 3003.

In 3008, the HSI driver 3004 programs the head buffer descriptor for the HSI hardware 3005.

In 3009, the HSI driver 3004 receives IP packets from the application processor 302 via transfers of pre-fixed PDU size. The IP packets are stored in IP buffers indicated by the buffer descriptors read from the linked list.

In 3010, if a buffer descriptor indicates that an interrupt should be issued after processing the buffer descriptor (i.e. after processing the IP packet to be stored in the IP buffer corresponding to the buffer descriptor). In this example, this is done when all buffers have been filled.

In 3011, the HSI driver 3004 requests new buffer descriptors from the buffer management entity 3002.

In 3012, the buffer management entity 3002 updates the linked list by adding buffer descriptors at the end of the linked list and provides new buffer descriptors by transmitting the updated linked list to the HSI driver 3004 in 3013.

In 3014, the HSI driver 3004 reads out a pointer indicating the last buffer descriptor processed by the HSI hardware 3005, i.e. the last buffer descriptor that has been processed before a buffer descriptor that is currently processed in 3020 such that a conflict between reading from and writing to the same buffer is avoided. The HSI driver 3004 for example periodically checks the pointer indicating the last buffer descriptor such that no buffer is missed in the processing.

In 3015, the HSI driver 3004 terminates the linked list and hands over the buffer descriptors to the S-IO 3003 in 3014.

In 3016, the S-IO 3003 parses the parses the indicated buffers, extracts the IP packets and sets up a new linked list of packet buffer descriptors for the protocol stack which it hands over to the protocol stack 3001 in 3017.

In 3018, the protocol stack sends the data (e.g. to a base station) and marks the buffers which have been processed.

It should be noted that the buffer management entity may re-claim buffers in 3019.

Alternatively to reading a pointer indicating the previous buffer descriptor, a similar synchronization may be carried out by reading out a sequence number to find out the last buffer descriptor that has been processed by the HSI hardware 3005. This however requires the buffer management entity 3002 to assure monotonic increasing sequence numbers of the buffer descriptors.

In the following, an example for a semaphore-based synchronization is described.

FIG. 31 shows a message flow diagram 3100 for synchronization by semaphore.

The message flow takes place between a protocol stack 3101 (e.g. corresponding to protocol stack 307, a buffer management entity 3102 (e.g. implemented as part of the operating system of the communication device 300), a S-IO 3103 (e.g. corresponding to S-IO 308), a HSI driver 3104 (e.g. corresponding to IPC protocol driver 303 and IPC physical driver 304) and HSI hardware 3105 (e.g. corresponding to HSI hardware 305).

The message flow corresponds to the case of synchronizing by semaphore.

The processing of 3106 to 3113 is similar to the processing of 3006 to 3013 described with reference to FIG. 30. It should be noted that in 3111, 3112, 3113, alternatively to 3011, 3012, 3013, the buffer management may provide a linked list of buffer descriptors upon request and the linked list tail may be updated accordingly by the HSI driver 3104.

It should further be noted that in 3109, the HSI hardware 3105 updates a semaphore via a write operation to the corresponding buffer descriptor to protect a buffer that is currently written by the HSI hardware 3105.

In 3114, the HSI driver 3104 parses the link list to find buffer descriptors that have been processed by the HSI hardware 3105. The following processing in 3115 to 3118 is similar to the processing in 3014 to 3017. In 3118, done buffer descriptors may be released. Further, in 3119, buffers may be re-claimed by the buffer management entity 3102, e.g. when the stored IP packets have been sent out.

In the following, an example for an interrupt-based synchronization is described.

FIG. 32 shows a message flow diagram 3200 for synchronization by interrupt.

The message flow takes place between a protocol stack 3201 (e.g. corresponding to protocol stack 307, a buffer management entity 3202 (e.g. implemented as part of the operating system of the communication device 300), a S-IO 3203 (e.g. corresponding to S-IO 308), a HSI driver 3204 (e.g.

corresponding to IPC protocol driver 303 and IPC physical driver 304) and HSI hardware 3205 (e.g. corresponding to HSI hardware 305).

The message flow corresponds to the case of synchronizing by interrupt.

The processing of 3206 to 3213 is similar to the processing of 3006 to 3013 described with reference to FIG. 30. It should be noted that in 3211, 3212, 3213, alternatively to 3011, 3012, 3013, the buffer management may provide a linked list of buffer descriptors upon request and the linked list tail may be updated accordingly by the HSI driver 3204.

In this example, when the HSI hardware 3205 has stored an IP packet in a buffer, it issues an interrupt in 3214. The HSI driver 3204 hands over the buffer descriptor of the buffer in 3215 to the S-IO 3203 and programs the head buffer descriptor in 3216 for the HSI hardware 3205.

In 3217, the S-IO parses the buffer corresponding to the buffer descriptor, extracts the IP packet (or IP packets in case that more than one IP packet is stored in a buffer) stored in the buffer and sets up a linked list of packet buffer descriptors for the protocol stack 3201 which it hands over to the protocol stack 3201 in 3218.

The protocol stack 3201 processes the indicated buffers and marks the processed buffers in 3219.

The buffer management entity 3202 may re-claim buffers (e.g. buffers that have been released) in 3220.

In the following, an example for an next-pointer-based synchronization is described.

FIG. 33 shows a message flow diagram 3300 for synchronization by next pointer.

The message flow takes place between a protocol stack 3301 (e.g. corresponding to protocol stack 307, a buffer management entity 3302 (e.g. implemented as part of the operating system of the communication device 300), a S-IO 3303 (e.g. corresponding to S-IO 308), a HSI driver 3204 (e.g. corresponding to IPC protocol driver 303 and IPC physical driver 304) and HSI hardware 3305 (e.g. corresponding to HSI hardware 305).

The message flow corresponds to the case of synchronizing by a next pointer.

The processing of 3306 to 3313 is similar to the processing of 3006 to 3013 described with reference to FIG. 30. It should be noted that in 3311, 3312, 3313, alternatively to 3011, 3012, 3013, the buffer management may provide a linked list of buffer descriptors upon request and the linked list tail may be updated accordingly by the HSI driver 3304.

In 3314, the HSI driver 3304 reads out a pointer indicating the next buffer descriptor to be processed by the HSI hardware 3305. Using this pointer, the HSI driver 3304 finds out the last buffer descriptor that has been processed by the HSI hardware 3305.

The processing of 3315 to 3318 is similar to the processing of 3015 to 3018 described with reference to FIG. 30.

The buffer management entity 3302 may re-claim buffers (e.g. buffers that have been released) in 3319.

In the following, an example for a previous-pointer-based synchronization for downlink data transmission is described.

FIG. 34 shows a message flow diagram 3400 for synchronization by previous pointer.

The message flow takes place between a protocol stack 3401 (e.g. corresponding to protocol stack 307, a buffer management entity 3402 (e.g. implemented as part of the operating system of the communication device 300), a S-IO 3403 (e.g. corresponding to S-IO 308), a HSI driver 3404 (e.g. corresponding to IPC protocol driver 303 and IPC physical driver 304) and HSI hardware 3405 (e.g. corresponding to HSI hardware 305).

The message flow corresponds to the case of synchronizing by a previous pointer.

In 3406, the protocol stack 3401 requests a buffer descriptor linked list from the buffer management entity 3402.

In 3407, the buffer management entity 3401 allocates data buffers and provides a linked list of buffer descriptors to the protocol stack 3401.

In 3408, the protocol stack 3401 hands over the packet buffer descriptors to the HSI driver 3404 which in turn programs the head buffer descriptor (i.e. sets the first buffer descriptor) for the HSI hardware 3405 in 3409.

In 3410, the HSI hardware 3405 reads IP packets from the buffers and forwards them to the application processor 302.

In 3411, the protocol stack 3401 may provide additional buffer descriptors which are, in 3412 added to the link list by the HSI driver 3404, for example by updating the tail of the linked list accordingly.

In 3413, the HSI driver 3404 may read a pointer indicating the previous buffer descriptor to find out the last buffer descriptor that has been processed by the HSI hardware 3405.

In 3414, the HSI driver 3414 parses the link list and marks buffers which have been processed.

The buffer management entity 3402 may in 3415 re-claim buffer descriptors which have been processed.

It should be noted that alternatively to using a previous buffer descriptor pointer, the HSI driver 3404 may use a next buffer descriptor pointer indicating the next buffer descriptor to be processed by the HSI hardware 3405 to find out the last buffer descriptor that has been processed by the HSI hardware 3405.

Further, it should be noted that 3409 may include accumulating IP packets to fill transfer frames to be transferred over the HSI interface. This may also be done in 3412.

It should be noted that the synchronization via next pointer (as in FIG. 33 and similarly for downlink transmission as mentioned in context of figure) can be seen to be the most optimized version of synchronization. In this case, in both UL and DL direction the HW is only programmed at the beginning with the head buffer descriptor of a linked list of buffer descriptors (BD). A buffer descriptor represents a PDU of the data link layer protocol. During on-going transfers the SW and HW are able to process PDU autonomously. The SW updates continuously the tail BD of the linked list whenever new PDUs become available. The SW and HW are synchronized via a tail IRQ or by SW reading the last HS processed BD in a special HW register.

According to one aspect of this disclosure, as described above, an efficient data linker layer protocol on top of the MIPI HIS physical layer, an efficient interaction between IPC SW and IPC HW and an efficient interaction between IPC and cellular protocol stack are provided. The data link layer protocol can be seen to define a bare minimum of control messages. Using fixed-length PDUs with optimized frame format the protocol handshake between two devices is restricted to initial setup and flow control. The PDU format allows efficient back to back transmission of multiple IP packets per PDU. The net throughput is drastically increased reaching almost the physical limit of the link. To enable flow-control a credit based mechanism is specified. The reduced protocol handshake and the transmission of multiple IP packets in each PDU increase drastically the link efficiency.

According to one aspect of this disclosure, the SW interaction between IPC HW and IPC SW is reduced to a maximum of one IRQ per PDU transferring multiple IP packets. A PDU is formed by using DMA gather operation of IP packets without any need for copying the payload. In an optimized implementation linked lists of PDUs can be transferred or received without any time consuming interaction between HW and SW.

The PDU format supports alignment of IP packets inside PDUs and a header space before each IP packets. IP packets can be exchanged between IPC and cellular protocol stack without the need to copy the payload. Only packets descriptors are received or transmitted to the cellular protocol stack. The payload, i.e. the IP packets, is not unnecessarily moved. A similar optimized processing is enabled on application processor side by taking receiver constraints into account via the alignment and header space parameters.

Having a unified buffer manager dealing with fixed-size PDUs the complexity of memory management is reduced by allowing even continuous re-use of initially allocated buffer, no need for dynamic memory allocation.

According to one aspect of this disclosure, an efficient data link layer protocol on top of MIPI HIS physical layer is provided using control messages for opening pre-configured communication links over logical channel. The user data is transmitted in fixed-length PDU. The PDU format allows transmission of multiple IP packets. Furthermore the PDU format supports packet alignment and header space for later processing steps. Thanks do flow control via credits mechanism the sender can always be sure that the receiver is able to accept transmission of PDUs.

Using scatter-gather linked list processing between HW and SW, building of PDU is enabled without the need of copy operations. A unified memory manager supports the memory management and the exchange of buffer descriptors for IP packets and PDUs. By transferring several IP packets in a single large IPC transfer a data path with minimum SW interaction is enabled. On HW side the IPC controllers traverse autonomously linked-list of buffer descriptors thanks to in-build scatter/gather linked-list DMA capabilities.

While the specific aspects have been particularly shown and described with, it should be understood by those skilled in the art that various changes in form and detail may be made therein without departing from the spirit and scope as defined by the appended claims. The scope is thus indicated by the appended claims and all changes which come within the meaning and range of equivalency of the claims are therefore intended to be embraced.

What is claimed is:

1. A data processing device comprising:
a controller configured to open a logical channel with another data processing device;
a receiver configured to receive a message from the other data processing device specifying a data link layer protocol data unit size to be used for exchanging data via the logical channel, wherein
the receiver is further configured to receive a data link layer packet data unit from the other data processing device including at least one network layer packet and an unused message part which is at least the indicated data link layer header size and which is arranged within the data link layer packet unit at a position of a data link layer header of the network layer packet; and
a transceiver configured to exchange data with the other data processing device over the logical channel in accordance with the data link layer protocol data unit size wherein the data link layer protocol data unit size is constant for the logical channel until the logical channel is closed.

2. The data processing device of claim 1, wherein the controller is configured to open the logical channel by establishing a connection with the other data processing device over the logical channel.

3. The data processing device of claim 2, wherein the controller is configured to close the logical channel by releasing the connection.

4. The data processing device of claim 1, wherein the controller is configured to open the logical channel by transmitting a message to the other data processing device indicating that the data processing device requests that the logical channel should be opened.

5. The data processing device of claim 4, wherein the data link layer protocol data unit size is specified in the message.

6. The data processing device of claim 5, wherein the data link layer protocol data unit size is specified in bytes or words.

7. The data processing device of claim 4, wherein the controller is configured to transmit the message via another logical channel to the other data processing device.

8. The data processing device of claim 7, wherein the other logical channel is a control channel.

9. The data processing device of claim 1, wherein the data processing device is a modem processor and the other data processing device is an application processor or the data processing device is an application processor and the other data processing device is a modem processor.

10. The data processing device of claim 1, wherein the data processing device and the other data processing device are components of the same communication device.

11. The data processing device of claim 10, wherein the communication device is a cellular communication device.

12. A data processing device comprising:
a controller configured to open a logical channel with another data processing device;
a transmitter configured to send a message to the other data processing device specifying a data link layer protocol unit size to be used for exchanging data via the logical channel, wherein
the transmitter is further configured to transmit a data link layer packet data unit to the other data processing device including at least one network lam packet and an unused message part which has at least the indicated data link layer header size and which is arranged within the data link layer packet unit at a position of a data link layer header of the network layer packet; and
a transceiver configured to exchange data with the other data processing device over the logical channel in accordance with the data link layer protocol data unit size wherein the data link layer protocol data unit size is constant until the logical channel is closed.

13. A data processing device comprising:
a generator configured to generate a data link layer packet data unit based on a data link layer header size required by another data processing device for transmitting a network layer packet,
wherein the data link layer packet data unit includes a plurality of network layer packets and includes, for each network layer packet, an unused part which has at least the indicated data link layer header size and which is arranged within the data link layer packet data unit at a position of a data link layer header of the network layer packet.

14. The data processing device of claim 13, further comprising a determiner configured to determine the data link layer header size required by the other data processing device for transmitting a network layer packet.

15. The data processing device of claim 14, further comprising a receiver configured to receive a message from the other data processing device indicating the data link layer header size required by the other data processing device for transmitting a network layer packet.

16. The data processing device of claim 13, wherein the at least one network layer packet is an IP packet.

17. The data processing device of claim 13, wherein the data processing device is a modem processor and the other data processing device is an application processor or the data processing device is an application processor and the other data processing device is a modem processor.

18. The data processing device of claim 13, wherein the data processing device and the other data processing device are components of the same communication device.

19. The data processing device of claim 18, wherein the communication device is a cellular communication device.

20. A data processing device comprising:
- a transmitter configured to transmit a message to another data processing device indicating a data link layer header size required by the data processing device for transmitting a network layer packet; and
- a receiver configured to receive a data link layer packet data unit from the other processing device including at least one network layer packet and an unused message part which has at least the indicated data link layer header size and which is arranged within the data link layer packet unit at a position of a data link layer header of the network layer packet.

\* \* \* \* \*

UNITED STATES PATENT AND TRADEMARK OFFICE
CERTIFICATE OF CORRECTION

| | |
|---|---|
| PATENT NO. | : 8,938,551 B2 |
| APPLICATION NO. | : 13/469204 |
| DATED | : January 20, 2015 |
| INVENTOR(S) | : Ulrich Leucht-Roth |

It is certified that error appears in the above-identified patent and that said Letters Patent is hereby corrected as shown below:

In the Claims

Claim 12 - Column 34, line 42: delete "network lam packet" and write --network layer packet-- in place thereof.

Signed and Sealed this
Fourteenth Day of July, 2015

Michelle K. Lee
*Director of the United States Patent and Trademark Office*